(12) United States Patent
Frey et al.

(10) Patent No.: US 7,529,781 B2
(45) Date of Patent: May 5, 2009

(54) ONLINE INITIAL MIRROR SYNCHRONIZATION AND MIRROR SYNCHRONIZATION VERIFICATION IN STORAGE AREA NETWORKS

(75) Inventors: Robert Tower Frey, Milpitas, CA (US); Chao Zhang, Milpitas, CA (US); Poulo Kuriakose, Cupertino, CA (US); Rajesh Ananthanarayanan, San Jose, CA (US); Hawkins Yao, San Jose, CA (US)

(73) Assignee: EMC Corporation, Hopkinton, MA (US)

( * ) Notice: Subject to any disclaimer, the term of this patent is extended or adjusted under 35 U.S.C. 154(b) by 435 days.

(21) Appl. No.: 10/837,248

(22) Filed: Apr. 30, 2004

(65) Prior Publication Data

US 2006/0036648 A1 Feb. 16, 2006

(51) Int. Cl.
*G06F 17/30* (2006.01)

(52) U.S. Cl. .................. 707/204; 707/104.1; 707/1

(58) Field of Classification Search ............... 707/1–10, 707/100–104.1, 200–206; 714/16; 343/700 MS; 209/576

See application file for complete search history.

(56) References Cited

U.S. PATENT DOCUMENTS

| | | | |
|---|---|---|---|
| 5,719,854 | A | 2/1998 | Choudhury et al. |
| 6,148,421 | A | 11/2000 | Hoese et al. |
| 6,260,120 | B1 | 7/2001 | Blumenau et al. |
| 6,292,489 | B1 | 9/2001 | Fukushima et al. |
| 6,400,730 | B1 | 6/2002 | Latif et al. |
| 6,438,595 | B1 | 8/2002 | Blumenau et al. |
| 6,621,818 | B1 | 9/2003 | Szczepanek et al. |
| 6,647,019 | B1 | 11/2003 | McKeown et al. |
| 6,687,247 | B1 | 2/2004 | Wilford et al. |
| 6,693,906 | B1 | 2/2004 | Tzeng |
| 6,725,393 | B1 | 4/2004 | Pellegrino et al. |

(Continued)

FOREIGN PATENT DOCUMENTS

WO WO 01/06385 A1 12/2001

OTHER PUBLICATIONS

Blunden Metal: "Storage Networking Virtualization what it all about" IBM Red Books, Dec. 2000.

*Primary Examiner*—Yicun Wu
(74) *Attorney, Agent, or Firm*—Barry N. Young

(57) ABSTRACT

Systems and methods in accordance with various disclosed embodiments can manage a mirrored virtual target to synchronize the members of the virtual target and/or to verify that the members of the virtual target are synchronized. In one embodiment, a mirrored virtual target is synchronized by first provisioning at least one first internal virtual logical unit (IVLU) corresponding to at least one destination target of the mirrored target and a second IVLU corresponding to a source target of the mirrored target. A write command is first issued, via one or more internal virtual logical units, to each of the destination target members of the mirrored target. When each destination target is available to receive data, as evidenced by a returned transfer ready signal, a read command is provided to the source target via the second internal virtual logical unit. In this manner, a data path between the source and destination targets is established prior to reading data from the source target. Accordingly, the data can be read from the source target, converted to write data, and routed to the destination targets at line speed without buffering of the data. A similar process is provided to verify that the members of a mirrored target are synchronized. In one embodiment, a system and method is provided to manage incoming commands for the mirrored target while synchronizing or verifying synchronization of the mirrored target. Incoming commands can be queued as they are received and provided to the mirrored target when pending synchronization or verification commands are completed.

45 Claims, 18 Drawing Sheets

U.S. PATENT DOCUMENTS

| | | |
|---|---|---|
| 6,745,207 B2 | 6/2004 | Reuter et al. |
| 6,785,290 B1 | 8/2004 | Fujisawa et al. |
| 6,831,916 B1 | 12/2004 | Parthasarathy et al. |
| 6,880,070 B2 | 4/2005 | Gentieu et al. |
| 6,970,134 B2 * | 11/2005 | Asai et al. ............. 343/700 MS |
| 6,993,027 B1 | 1/2006 | Kadambi et al. |
| 7,127,566 B2 | 10/2006 | Ramakrishnan et al. |
| 7,137,032 B2 * | 11/2006 | Lubbers et al. ................ 714/16 |
| 7,165,095 B2 * | 1/2007 | Sim .......................... 709/217 |
| 7,171,434 B2 * | 1/2007 | Ibrahim et al. ............... 707/204 |
| 7,173,207 B2 * | 2/2007 | Losbrock et al. ............ 209/576 |
| 7,177,866 B2 * | 2/2007 | Holenstein et al. ............. 707/8 |
| 7,185,062 B2 | 2/2007 | Lolayekar et al. |
| 2002/0057684 A1 | 5/2002 | Miyamoto et al. |
| 2002/0194324 A1 | 12/2002 | Guha |
| 2003/0074473 A1 | 4/2003 | Pham et al. |
| 2005/0076091 A1 | 4/2005 | Missimer et al. |
| 2005/0192967 A1 | 9/2005 | Basavalah et al. |

* cited by examiner

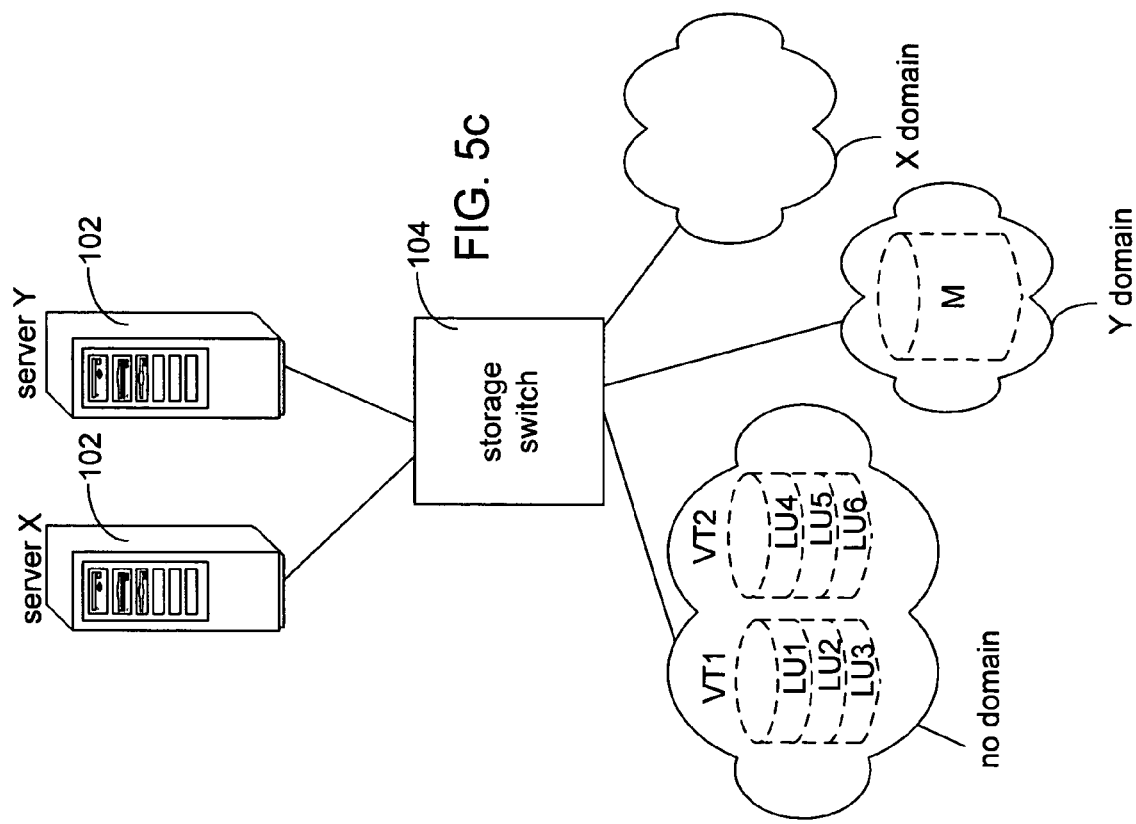

(Virtualization Ingress - cmd)

(Virtualization - Egress - cmd)

(Virtualization - Ingress - R2T/XFR_RDY)

(Virtualization - Egress - R2T/XFR_RDY)

(Virtualization - Ingress - write data packet)

(Virtualization - Egress -
write data pkt)

ONLINE INITIAL MIRROR SYNCHRONIZATION AND MIRROR SYNCHRONIZATION VERIFICATION IN STORAGE AREA NETWORKS

CROSS-REFERENCE TO RELATED APPLICATIONS

The following applications are cross-referenced and incorporated by reference herein in their entirety:

U.S. patent application Ser. No. 10/833,438, entitled PROACTIVE TRANSFER READY RESOURCE MANAGEMENT IN STORAGE AREA NETWORKS, filed Apr. 28, 2004;

U.S. patent application Ser. No. 10/833,457, entitled REACTIVE DEADLOCK MANAGEMENT IN STROAGE AREA NETWORKS, filed Apr. 28, 2004;

U.S. patent application Ser. No. 10/051,321, entitled STORAGE SWITCH FOR STORAGE AREA NETWORK, filed Jan. 18, 2002;

U.S. patent application Ser. No. 10/051,415, entitled PROTOCOL TRANSLATION IN A STORAGE SYSTEM, filed Jan. 18, 2002;

U.S. patent application Ser. No. 10/051,164, entitled SWITCHED-BASED STORAGE SERVICES, filed Jan. 18, 2002, now U.S. Pat. No. 7,185,062, issued Feb. 27, 2007;

U.S. patent application Ser. No. 10/051,093, entitled PACKET CLASSIFICATION IN A STORAGE SYSTEM, filed Jan. 18, 2002;

U.S. patent application Ser. No. 10/051,396, entitled VIRTUALIZATION IN A STORAGE SYSTEM, filed Jan. 18, 2002;

U.S. patent application Ser. No. 10/051,339, entitled ENFORCING QUALITY OF SERVICE IN A STORAGE NETWORK, filed Jan. 18, 2002;

U.S. patent application Ser. No. 10/050,974, entitled POOLING AND PROVISIONING STORAGE RESOURCES IN A STORAGE NETWORK, filed Jan. 18, 2002, now U.S. Pat. No. 6,976,134, issued Dec. 13, 2005; and U.S. patent application Ser. No. 10/051,053, entitled LOAD BALANCING IN A STORAGE NETWORK, filed Jan. 18, 2002.

BACKGROUND OF THE INVENTION

1. Field of the Invention

The present invention relates generally to storage area networks.

2. Description of the Related Art

The management of information is becoming an increasingly daunting task in today's environment of data intensive industries and applications. More particularly, the management of raw data storage is becoming more cumbersome and difficult as more companies and individuals are faced with larger and larger amounts of data that must be effectively, efficiently, and reliably maintained. Entities continue to face the necessity of adding more storage, servicing more users, and providing access to more data for larger numbers of users.

The concept of storage area networks or SAN's has gained popularity in recent years to meet these increasing demands. Although various definitions of a SAN exist, a SAN can generally be considered a network whose primary purpose is the transfer of data between computer systems and storage elements and among storage elements. A SAN can form an essentially independent network that does not have the same bandwidth limitations as many of its direct-connect counterparts including storage devices connected directly to servers (e.g., with a SCSI connection) and storage devices added directly to a local area network (LAN) using traditional Ethernet interfaces, for example.

In a SAN environment, targets, which can include storage devices (e.g., tape drives and RAID arrays) and other devices capable of storing data, and initiators, which can included servers, personal computing devices, and other devices capable of providing write commands and requests, are generally interconnected via various switches and/or appliances. The connections to the switches and appliances are usually Fibre Channel. This structure generally allows for any initiator on the SAN to communicate with any target and vice versa. It also provides alternative paths from initiator to target. In other words, if a particular initiator is slow or completely unavailable, another initiator on the SAN can provide access to the target. A SAN also makes it possible to mirror data, making multiple copies available and thus creating more reliability in the availability of data. When more storage is needed, additional storage devices can be added to the SAN without the need to be connected to a specific initiator, rather, the new devices can simply be added to the storage network and can be accessed from any point.

Some SAN's utilize appliances to perform storage management for the SAN. A typical appliance may receive and store data within the appliance, then, with an internal processor for example, analyze and operate on the data in order to forward the data to the appropriate target(s). Such store-and-forward processing can slow down data access, including the times for reading data from and writing data to the storage device(s).

While appliances can perform switching operations, switches are often used to connect initiators with appliances, given the large number of initiators and small number of ports included in many appliances. In more current SAN implementations, switches have replaced certain functionality previously preformed by appliances such that appliances are not necessary and can be eliminated from the systems.

SANs, typically through switches and/or appliances, perform virtualization functions to allocate space of one or more physical targets to a particular user with the physical space remaining unknown to the user. For example, a company may utilize a SAN to provide data storage that employees access for data storage and retrieval. An engineering department, for example, may have storage allocated as "engineering storage space." The employees may see and interact with the virtual space as they would see or interact with a physical storage device such as an attached hard disk drive. Nevertheless, the space may actually be divided over multiple physical storage devices and even be fragmented within single storage devices. A switch or appliance can receive a request for a virtual space and block number(s) and determine the device(s) and portions thereof that physically correlate to the virtual space requested in order to direct the data accordingly.

More recent storage area network switches are capable of routing data between initiators and targets without buffering the data as required by earlier appliances used in SAN's. For example, some storage switches can route data packets without introducing more latency to the packets than would be introduced by a typical network switch. Such unbuffered data transfer between initiators and targets must be handled reliably and efficiently by the switch performing the interconnection. An example of a storage switch can be found in co-pending U.S. patent application Ser. No. 10/051,396, entitled VIRTUALIZATION IN A STORAGE SYSTEM, filed Jan. 18, 2002.

For example, an important feature of SANs is the ability to reliably and efficiently store data in multiple targets or within multiple logical units of one or more targets through so called mirroring or use of a mirrored virtual target. Some networks may include a storage area (or virtual target) that maintains multiple copies of data in one or more physical locations for increased reliability of data storage. Accordingly, a switch in such a network may route data to two or more storage devices, for example, in response to a request to write data to the storage area.

In order to establish a mirrored virtual target, the data of each of the mirrored virtual target members must be synchronized. Typically, the data of one target is designated as source data which is written to the other devices forming the mirrored virtual target. In buffered implementations, the data can be read from the source target, buffered, and then written to each of the other targets when they are available to receive the data.

To achieve an unbuffered implementation, however, the source data should not be maintained in the switch to wait until the destination targets are available to receive it. Accordingly, a system and method is needed to synchronize a mirrored virtual target in a manner that facilitates the transfer of data from a source target to one or more destination targets without buffering in the switch. Additionally, a system and method is needed to maintain the integrity and synchronicity of a mirrored virtual target while performing an initial mirror synchronization and receiving commands from an initiating device for the mirrored virtual target.

SUMMARY OF THE INVENTION

In accordance with various embodiments, systems and methods are provided to manage a mirrored virtual target. In one embodiment, a storage switch performs an initial mirror synchronization of a mirrored virtual target to synchronize the data among members of the virtual target.

One embodiment includes provisioning an internal virtual target (IVT) corresponding to the members of the mirrored target being synchronized. A first internal virtual logical unit (IVLU) can be established for a member of the mirrored target designated a source target for the data to be synchronized. One or more additional IVLUs can be established for each of the remaining members, or destination targets, of the mirrored target. After provisioning the IVT, a write command can be provided to each destination target member, via the IVT and respective IVLUs. Once each destination target returns a transfer ready signal, a read command can be provided to the source target via its respective IVLU. By waiting for a transfer ready signal from each destination target before issuing a read command to the source target, a storage switch in accordance with an embodiment can establish an internal data path prior to receiving data to be synchronized. Accordingly, data can be read from the source target, converted to write data, and provided to each destination target at line speed and without buffering the data in the storage switch.

In one embodiment, an IVT is provisioned at a first processing unit. A second processing unit includes a copy service manager that can provide read and write commands to the IVT. The write commands can be received at the first processing unit and routed to the appropriate destination target members using information provisioned for the IVT.

In one embodiment, a storage switch performs a mirror synchronization verification to verify that the members of a mirrored virtual target are synchronized. Similarly to an initial mirror synchronization, an IVT can be provisioned and a read command provided to each destination target via the IVT. Once a transfer ready signal is returned from each destination target, a read command is provided to the source target. Data received from the source target can be converted to verify data and provided to the destination targets for verification at line speed and without buffering.

In one embodiment, a storage switch manages incoming commands for a mirrored virtual target while the mirrored virtual target is being synchronized or verified. Commands received for the mirrored target are not immediately provided to the mirrored target. The commands can be temporarily queued while the switch completes any pending synchronization or verification commands. After the synchronization or verification commands are complete, the switch can dequeue and provide the commands from the initiator to the mirrored virtual target.

In accordance with one embodiment, a method of managing a mirrored target is provided that includes determining an availability of at least one destination target to receive data and providing a read command to a source target only when the at least one destination target is determined to be available to receive data. In one embodiment, the method further includes receiving read data from the source target, converting the read data to write or verify data, and providing the write or verify data to the at least one destination target.

In accordance with one embodiment, an apparatus to manage a mirrored virtual target is provided that includes at least one port in communication with at least one destination target and a source target and at least one processing unit in communication with the at least one port. The at least one processing unit provides a read command to the source target only when the at least one destination target is available to receive data.

The present invention can be accomplished using hardware, software, or a combination of both hardware and software. The software used for the present invention is stored on one or more processor readable storage devices including hard disk drives, CD-ROMs, DVDs, optical disks, floppy disks, tape drives, RAM, ROM, flash memory or other suitable storage devices. In alternative embodiments, some or all of the software can be replaced by dedicated hardware including custom integrated circuits, gate arrays, FPGAs, PLDs, and special purpose processors. In one embodiment, software implementing the present invention is used to program one or more processors. The one or more processors can be in communication with one or more storage devices (hard disk drives, CD-ROMs, DVDs, optical disks, floppy disks, tape drives, RAM, ROM, flash memory or other suitable storage devices), peripherals (printers, monitors, keyboards, pointing devices) and/or communication interfaces (e.g. network cards, wireless transmitters/receivers, etc.).

Other features, aspects, and objects of the invention can be obtained from a review of the specification, the figures, and the claims.

BRIEF DESCRIPTION OF THE DRAWINGS

FIGS. 5*a*-5*c* are generalized functional block diagrams of a storage area network illustrating an exemplary provisioning of virtual targets;

DETAILED DESCRIPTION

Figure 1:
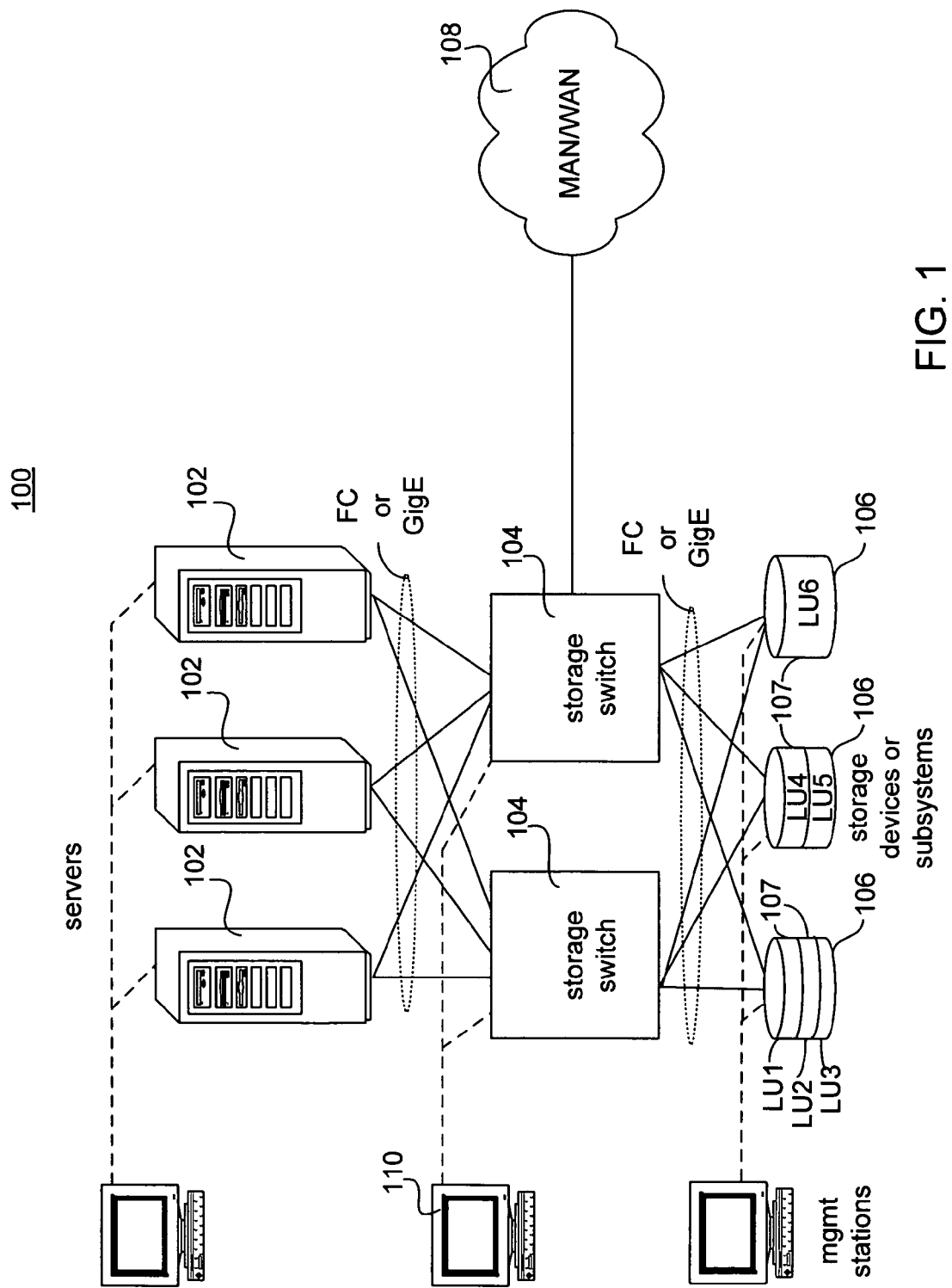
FIG. 1 is a generalized functional block diagram of a storage area network in accordance with one embodiment.

An exemplary system 100 including a storage switch in accordance with one embodiment is illustrated in FIG. 1. System 100 can include a plurality of initiating devices such as servers 102. It will be appreciated that more or fewer servers can be used and that embodiments can include any suitable physical initiator in addition to or in place of servers 102. Although not shown, the servers could also be coupled to a LAN. As shown, each server 102 is connected to a storage switch 104. In other embodiments, however, each server 102 may be connected to fewer than all of the storage switches 104 present. The connections formed between the servers and switches can utilize any protocol, although in one embodiment the connections are Fibre Channel or Gigabit Ethernet (carrying packets in accordance with the iSCSI protocol). Other embodiments may use the Infiniband protocol, defined by Intel Inc., or other protocols or connections.

In some embodiments, one or more switches 104 are each coupled to a Metropolitan Area Network (MAN) or Wide Area Network (WAN) 108, such as the Internet. The connection formed between a storage switch 104 and a WAN 108 will generally use the Internet Protocol (IP) in most embodiments. Although shown as directly connected to MAN/WAN 108, other embodiments may utilize a router (not shown) as an intermediary between switch 104 and MAN/WAN 108.

In addition, respective management stations 110 are connected to each storage switch 104, to each server 102, and to each storage device 106. Although management stations are illustrated as distinct computers, it is to be understood that the software to manage each type of device could collectively be on a single computer.

Such a storage switch 104, in addition to its switching function, can provide virtualization and storage services (e.g., mirroring). Such services can include those that would typically be provided by appliances in conventional architectures.

In addition, the intelligence of a storage switch in accordance with an embodiment of the invention is distributed to every switch port. This distributed intelligence allows for system scalability and availability. The distributed intelligence allows a switch in accordance with an embodiment to process data at "wire speed," meaning that a storage switch 104 introduces no more latency to a data packet than would be introduced by a typical network switch. Thus, "wire speed" for the switch is measured by the connection to the particular port. Accordingly, in one embodiment having OC-48 connections, the storage switch can keep up with an OC-48 speed (2.5 bits per ns). A two Kilobyte packet (with 10 bits per byte) moving at OC-48 speed can take as little as eight microseconds coming into the switch. A one Kilobyte packet can take as little as four microseconds. A minimum packet of 100 bytes can only elapse a mere 400 ns.

More information on various storage area networks, including a network as illustrated in FIG. 1 can be found in U.S. patent application Ser. No. 10/051,396, entitled VIRTUALIZATION IN A STORAGE SYSTEM, filed Jan. 18, 2002 and U.S. patent application Ser. No. 10/051,321, entitled STORAGE SWITCH FOR STORAGE AREA NETWORK, filed Jan. 18, 2002.

"Virtualization" generally refers to the mapping of a virtual target space subscribed to by a user to a space on one or more physical storage target devices. The terms "virtual" and "virtual target" (or "virtual logical unit") come from the fact that storage space allocated per subscription can be anywhere on one or more physical storage target devices connecting to a storage switch 104. The physical space can be provisioned as a "virtual target" or "virtual logical unit (VLU)" which may include one or more "logical units" (LUs). Each virtual target consists of one or more LUs identified with one or more LU numbers (LUNs), which are frequently used in the iSCSI and FC protocols. Each logical unit is generally comprised of one or more extents—a contiguous slice of storage space on a physical device. Thus, a virtual target or VLU may occupy a whole storage device (one extent), a part of a single storage device (one or more extents), or parts of multiple storage devices (multiple extents). The physical devices, the LUs, the number of extents, and their exact locations are immaterial and invisible to a subscriber user.

Storage space may come from a number of different physical devices, with each virtual target belonging to one or more "pools" in various embodiments, sometimes referred to herein as "domains." Only users of the same domain are allowed to share the virtual targets in their domain in one embodiment. Domain-sets can also be formed that include several domains as members. Use of domain-sets can ease the management of users of multiple domains, e.g., if one company has five domains but elects to discontinue service, only one action need be taken to disable the domain-set as a whole. The members of a domain-set can be members of other domains as well.

Figure 2:
FIG. 2 is a generalized functional block diagram of a storage switch in accordance with one embodiment.

FIG. 2 illustrates a functional block diagram of a storage switch 104 in accordance with an embodiment of the invention. More information regarding the details of a storage switch such as storage switch 104 and its operation can be found in U.S. patent application Ser. No. 10/051,321, entitled STORAGE SWITCH FOR STORAGE AREA NETWORK, filed Jan. 18, 2002. In one embodiment, the storage switch 104 includes a plurality of linecards 302, 304, and 306, a plurality of fabric cards 308, and two system control cards 310, each of which will be described in further detail below. Although an exemplary storage switch is illustrated, it will be appreciated that numerous other implementations and configurations can be used in accordance with various embodiments.

System Control Cards. Each of the two System Control Cards (SCCs) 310 connects to every line card 302, 304, 306. In one embodiment, such connections are formed by I²C signals, which are well known in the art, and through an Ethernet connection with the SCC. The SCC controls power up and monitors individual linecards, as well as the fabric cards, with the I²C connections. Using inter-card communication over the Ethernet connections, the SCC also initiates various storage services, e.g., snapshot and replicate.

In addition, the SCC maintains a database 312 that tracks configuration information for the storage switch as well as all virtual targets and physical devices attached to the switch, e.g., servers and storage devices. In addition, the database keeps information regarding usage, error and access data, as well as information regarding different domains and domain sets of virtual targets and users. The records of the database may be referred to herein as "objects." Each initiator (e.g., a server) and target (e.g., a storage device) has a World Wide Unique Identifier (WWUI), which are known in the art. The database is maintained in a memory device within the SCC, which in one embodiment is formed from flash memory, although other memory devices can be used in various embodiments.

The storage switch 104 can be reached by a management station 110 through the SCC 310 using an Ethernet connection. Accordingly, the SCC also includes an additional Ethernet port for connection to a management station. An administrator at the management station can discover the addition or removal of storage devices or virtual targets, as well as query and update virtually any object stored in the SCC database 312.

Fabric Cards. In one embodiment of switch 104, there are three fabric cards 308, although other embodiments could have more or fewer fabric cards. Each fabric card 308 is coupled to each of the linecards 302, 304, 306 in one embodiment and serves to connect all of the linecards together. In one embodiment, the fabric cards 308 can each handle maximum traffic when all linecards are populated. Such traffic loads handled by each linecard are up to 160 Gbps in one embodiment although other embodiments could handle higher or lower maximum traffic volumes. If one fabric card 308 fails, the two surviving cards still have enough bandwidth for the maximum possible switch traffic: in one embodiment, each linecard generates 20 Gbps of traffic, 10 Gbps ingress and 10 Gbps egress. However, under normal circumstances, all three fabric cards are active at the same time. From each linecard, the data traffic is sent to any one of the three fabric cards that can accommodate the data.

Linecards. The linecards form connections to servers and to storage devices. In one embodiment, storage switch 104 supports up to sixteen linecards although other embodiments could support a different number. Further, in one embodiment, three different types of linecards are utilized: Gigabit Ethernet (GigE) cards 302, Fibre Channel (FC) cards 304, and WAN cards 306. Other embodiments may include more or fewer types of linecards. The GigE cards 302 are for Ethernet connections, connecting in one embodiment to either iSCSI servers or iSCSI storage devices (or other Ethernet based devices). The FC cards 304 are for Fibre Channel connections, connecting to either Fibre Channel Protocol (FCP) servers or FCP storage devices. The WAN cards 306 are for connecting to a MAN or WAN.

Figure 3:
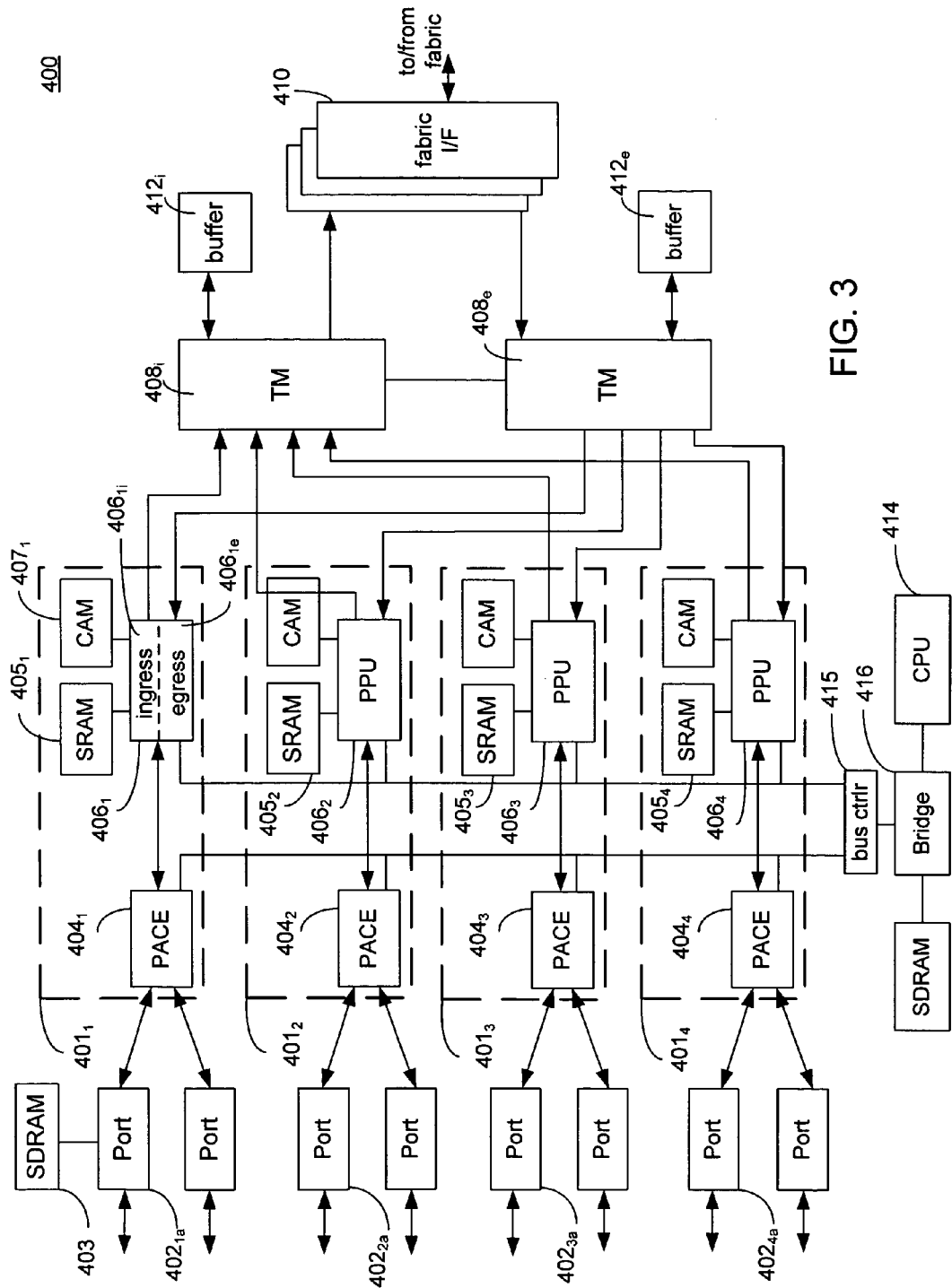
FIG. 3 is a generalized functional block diagram of a linecard used in a storage switch in accordance with one embodiment.

FIG. 3 illustrates a functional block diagram of a generic line card 400 used in a storage switch 104 in accordance with one embodiment. Line card 400 is presented for exemplary purposes only. Other line cards and designs can be used in accordance with embodiments. The illustration shows those components that are common among all types of linecards, e.g., GigE 302, FC 304, or WAN 306. In other embodiments other types of linecards can be utilized to connect to devices using other protocols, such as Infiniband.

Ports. Each line card 400 includes a plurality of ports 402. The ports form the linecard's connections to either servers or storage devices. Eight ports are shown in the embodiment illustrated, but more or fewer could be used in other embodiments. For example, in one embodiment each GigE card can support up to eight 1 Gb Ethernet ports, each FC card can support up to either eight 1Gb FC ports or four 2 Gb FC ports, and each WAN card can support up to four OC-48 ports or two OC-192 ports. Thus, in one embodiment, the maximum possible connections are 128 ports per switch 104. The ports of each linecard are full duplex in one embodiment, and connect to either a server or other client, and/or to a storage device or subsystem.

In addition, each port 402 has an associated memory 403. Although only one memory device is shown connected to one port, it is to be understood that each port may have its own memory device or the ports may all be coupled to a single memory device. Only one memory device is shown here coupled to one port for clarity of illustration.

Storage Processor Unit. In one embodiment, each port is associated with a Storage Processor Unit (SPU) 401. In one embodiment the SPU rapidly processes the data traffic allowing for wire-speed operations. In one embodiment, each SPU includes several elements: a Packet Aggregation and Classification Engine (PACE) 404, a Packet Processing Unit (PPU) 406, an SRAM 405, and a CAM 407. Still other embodiments may use more or fewer elements or could combine elements to obtain the same functionality. For instance, some embodiments may include a PACE and a PPU in the SPU, but the SPU may share memory elements with other SPUs.

PACE. Each port is coupled to a Packet Aggregation and Classification Engine (PACE) 404. As illustrated, the PACE 404 aggregates two ports into a single data channel having twice the bandwidth. For instance, the PACE 404 aggregates two 1 Gb ports into a single 2 Gb data channel. The PACE can classify each received packet into a control packet or a data packet. Control packets are sent to the CPU 414 for processing, via bridge 416. Data packets are sent to a Packet Processing Unit (PPU) 406, discussed below, with a local header added. In one embodiment the local header is sixteen bytes resulting in a data "cell" of 64 bytes (16 bytes of header and 48 bytes of payload). The local header is used to carry information and used internally by switch 104. The local header is removed before the packet leaves the switch. Accordingly, a "cell" can be a transport unit used locally in the switch that includes a local header and the original packet (in some embodiments, the original TCP/IP headers are also stripped from the original packet). Nonetheless, not all embodiments of the invention will create a local header or have "internal packets" (cells) that differ from external packets. Accordingly, the term "packet" as used herein can refer to either "internal" or "external" packets.

The classification function helps to enable a switch to perform storage virtualization and protocol translation functions at wire speed without using a store-and-forward model of conventional systems. Each PACE has a dedicated path to a PPU, e.g. PPU $406_1$, while all four PACEs in the illustrated embodiment share a path to the CPU 414, which in one embodiment is a 104 MHz/32 (3.2 Gbps) bit data path.

Packet Processing Unit (PPU). Each PPU such as PPU 406, performs virtualization and protocol translation on-the-fly, meaning that cells are not buffered for such processing. It also implements other switch-based storage service functions, described later. The PPU is capable, in one embodiment, of moving cells at OC-48 speed or 2.5 Gbps for both the ingress and egress directions, while in other embodiments it can move cells at OC-192 speeds or 10 Gbps. The PPU in one embodiment includes an ingress PPU $406_{1i}$ and an egress PPU $406_{1e}$, which both run concurrently. The ingress PPU $406_{1i}$ receives incoming data from PACE $404_1$ and sends data to the Traffic Manager $408_i$ while the egress PPU $406_{1e}$ receives data from Traffic Manager $408_e$ and sends data to a PACE $404_1$. Although only one PPU $406_1$ is shown in FIG. 3 as having an ingress PPU $406_{1i}$ and an egress PPU $406_{1e}$, it is to be understood that in one embodiment all PPUs 406 will include both an ingress and an egress PPU and that only one PPU is shown in FIG. 3 with both ingress and egress PPUs for clarity of illustration.

A large number of storage connections (e.g., server to virtual target) can be established concurrently at each port. Nonetheless, each connection is unique to a virtual target and can be uniquely identified by a TCP Control Block Index (in the case of iSCSI connections) and a port number. When a connection is established, the CPU 414 of the linecard 400 informs a PPU 406 of an active virtual target by sending it a Virtual Target Descriptor (VTD) for the connection. The VTD includes all relevant information regarding the connection and virtual target that the PPU will need to properly operate on the data, e.g., perform virtualization, translation, and various storage services. The VTD is derived from an object in the SCC database and usually contains a subset of information that is stored in the associated object in the SCC database.

Similarly, Physical Target Descriptors (PTDs) are utilized in an embodiment of the invention. PTDs describe the actual physical devices, their individual LUs, or their individual extents (a contiguous part of or whole LU) and will include information similar to that for the VTD. Also, like the VTD, the PTD is derived from an object in the SCC database.

To store the VTDs and PTDs and have quick access to them, in one embodiment the PPUs such as PPU $406_1$ are connected to an SRAM $405_1$ and CAM $407_1$. SRAM $405_1$ can store a VTD and PTD database. A listing of VTD Identifiers (VTD IDs), or addresses, as well as PTD Identifiers (PTD IDs), is also maintained in the PPU CAM $407_1$ for quick accessing of the VTDs. The VTD IDs are indexed (mapped) using a TCP Control Block Index and a LUN. The PTD IDs are indexed using a VTD ID. In addition, for IP routing services, the CAM $407_1$ contains a route table, which is updated by the CPU when routes are added or removed.

In various embodiments, each PPU will be connected with its own CAM and SRAM device as illustrated, or the PPUs will all be connected to a single CAM and/or SRAM (not illustrated).

For each outstanding request to the PPU (e.g., reads or writes), a task control block is established in the PPU SRAM 407 to track the status of the request. There are ingress task control blocks (ITCBs) tracking the status of requests received by the storage switch on the ingress PPU and egress task control blocks (ETCBs) tracking the status of requests sent out by the storage switch on the egress PPU. For each virtual target connection, there can be a large number of concurrent requests, and thus many task control blocks. Task control blocks are allocated as a request begins and freed as the request completes.

Traffic Manager. There are two traffic managers (TMs) 408 on each linecard 400: one TM $408_i$ for ingress traffic and one TM $408_e$ for egress traffic. The ingress TM receives cells from all four SPUs, in the form of 64-byte data cells, in one embodiment. In such an embodiment, each data cell has 16 bytes of local header and 48 bytes of payload. The header contains a FlowID that tells the TM the destination port of the cell. In some embodiments, the SPU may also attach a TM header to the cell prior to forwarding the cell to the TM. Either the TM or the SPU can also subdivide the cell into smaller cells for transmission through the fabric cards in some embodiments.

The ingress TM sends data cells to the fabric cards via a 128-bit 104 Mhz interface 410 in one embodiment. Other embodiments may operate at 125 Mhz or other speeds. The egress TM receives the data cells from the fabric cards and delivers them to the four SPUs.

Both ingress and egress TMs have a large buffer 412 to queue cells for delivery. Both buffers 412 for the ingress and egress TMs are 64 MB, which can queue a large number of packets for internal flow control within the switch. The cells are not buffered as in cached or buffered switch implementations. There is no transport level acknowledgement as in these systems. The cells are only temporarily buffered to maintain flow control within the switch. The cells maintain their original order and there is no level high level processing of the cells at the TM The SPUs can normally send cells to the ingress TM quickly as the outgoing flow of the fabric cards is as fast as the incoming flow. Hence, the cells are moving to the egress TM quickly. On the other hand, an egress TM may be backed up because the outgoing port is jammed or being fed by multiple ingress linecards. In such a case, a flag is set in the header of the outgoing cells to inform the egress SPU to take actions quickly. The egress TM also sends a request to the ingress SPU to activate a flow control function used in providing Quality of Service for Storage access. It is worth noting that, unlike communications traffic over the Internet, for storage traffic dropping a packet or cell is unacceptable. Therefore, as soon as the amount of cells in the buffer exceeds a specified threshold, the SPU can activate its flow control function to slow down the incoming traffic to avoid buffer overflow.

Fabric Connection. The fabric connection 410 converts the 256-bit parallel signals of the TM (128 bits ingress and 128 bits egress, respectively), into a 16-bit serial interface (8-bit ingress and 8-bit egress) to the backplane at 160 Gbps. Thus the backplane is running at one sixteenth of the pins but sixteen times faster in speed. This conversion enables the construction of a high availability backplane at a reasonable cost without thousands of connecting pins and wires. Further, because there are three fabric cards in one embodiment, there are three high-speed connectors on each linecard in one embodiment, wherein the connectors each respectively connect the 8-bit signals to a respective one of the three fabric cards. Of course, other embodiments may not require three fabric connections 410.

CPU. On every linecard there is a processor (CPU) 614, which in one embodiment is a PowerPC 750 Cxe. In one embodiment, CPU 414 connects to each PACE with a 3.2 Gb bus, via a bus controller 415 and a bridge 416. In addition, CPU 414 also connects to each PPU, CAM and TM, however, in some embodiments this connection is slower at 40 Mbps. Both the 3.2 Gb and 40 Mb paths allow the CPU to communicate with most devices in the linecard as well as to read and write the internal registers of every device on the linecard, download microcode, and send and receive control packets.

The CPU on each linecard is responsible to initialize every chip at power up and to download microcode to the SPUs and each port wherever the microcode is needed. Once the linecard is in running state, the CPU processes the control traffic. For information needed to establish a virtual target connection, the CPU requests the information from the SCC, which in turn gets the information from an appropriate object in the SCC database.

Distinction in Linecards—Ports. The ports in each type of linecard, e.g., GigE, FC, or WAN are distinct as each linecard supports one type of port in one embodiment. In other embodiments, other linecard ports could be designed to support other protocols, such as Infiniband.

GigE Port. A gigabit Ethernet port connects to iSCSI servers and storage devices. While the GigE port carries all kinds of Ethernet traffic, the only network traffic generally to be processed by a storage switch 104 at wire speed in accordance with one embodiment of the invention is an iSCSI Packet Data Unit (PDU) inside a TCP/IP packet. Nonetheless, in other embodiments packets in accordance with other protocols (like Network File System (NFS)) carried over Ethernet connections may be received at the GigE Port and processed by the SPU and/or CPU.

The GigE port receives and transmits TCP/IP segments for virtual targets or iSCSI devices. To establish a TCP connection for a virtual target, both the linecard CPU 414 and the SCC 310 are involved. When a TCP packet is received, and after initial handshaking is performed, a TCP control block is created and stored in the GigE port memory 403. A VTD is also retrieved from an object of the SCC database and stored in the CPU SDRAM 405 for the purpose of authenticating the connection and understanding the configuration of the virtual target. The TCP Control Block identifies a particular TCP session or iSCSI connection to which the packet belongs, and contains in one embodiment, TCP segment numbers, states, window size, and potentially other information about the connection. In addition, the TCP Control Block is identified by an index, referred to herein as the "TCP Control Block Index." A VTD for the connection can be created and stored in the SPU SRAM 405. The CPU creates the VTD by retrieving the VTD information stored in its SDRAM and originally obtained from the SCC database. A VTD ID is established in a list of VTD IDs in the SPU CAM 407 for quick reference to the VTD. The VTD ID is affiliated with and indexed by the TCP Control Block Index.

When the port receives iSCSI PDUs, it serves essentially as a termination point for the connection, but then the switch initiates a new connection with the target. After receiving a packet on the ingress side, the port delivers the iSCSI PDU to the PACE with a TCP Control Block Index, identifying a specific TCP connection. For a non-TCP packet or a TCP packet not containing an iSCSI PDU, the port receives and transmits the packet without acting as a termination point for the connection. Typically, the port 402 communicates with the PACE 404 that an iSCSI packet is received or sent by using a TCP Control Block Index. When the TCP Control Block Index of a packet is −1, it identifies a non-iSCSI packet.

FC Port. An FC port connects to servers and FC storage devices. The FC port appears as a fibre channel storage subsystem (i.e., a target) to the connecting servers, meaning, it presents a large pool of virtual target devices that allow the initiators (e.g., servers) to perform a Process Login (PLOGI or PRLI), as are understood in the art, to establish a connection. The FC port accepts the GID extended link services (ELSs) and returns a list of target devices available for access by that initiator (e.g., server).

When connecting to fibre channel storage devices, the port appears as a fibre channel F-port, meaning, it accepts a Fabric Login, as is known in the art, from the storage devices and provides name service functions by accepting and processing the GID requests—in other words, the port will appear as an initiator to storage devices.

In addition, an FC port can connect to another existing SAN network, appearing in such instances as a target with many LUs to the other network.

At the port initialization, the linecard CPU can go through both sending Fabric Logins, Process Logins, and GIDs as well as receive the same. The SCC supports an application to convert FC ELS's to iSNS requests and responses. As a result, the same database in the SCC keeps track of both the FC initiators (e.g., servers) and targets (e.g., storage devices) as if they were iSCSI initiators and targets.

When establishing an FC connection, unlike for a GigE port, an FC port does not need to create TCP control blocks or their equivalent; all the necessary information is available from the FC header. But, a VTD (indexed by a D_ID which identifies the destination of a frame) will still need to be established in a manner similar to that described for the GigE port.

An FC port can be configured for 1 Gb or 2 Gb. As a 1 Gb port, two ports are connected to a single PACE as illustrated in FIG. 3; but in an embodiment where it is configured as a 2 Gb port, port traffic and traffic that can be accommodated by the SPU should match to avoid congestion at the SPU. The port connects to the PACE with a POS/PHY interface in one embodiment. Each port can be configured separately, i.e. one PACE may have two 1 Gb ports and another PACE has a single 2 Gb port.

WAN Ports. In embodiments that include a WAN linecard, the WAN linecard supports OC-48 and OC-192 connections in one embodiment. Accordingly, there are two types of WAN ports: OC-48 and OC-192. For OC-48, there is one port for each SPU. There is no aggregation function in the PACE, although there still is the classification function. A WAN port connects to SONET and works like a GigE port as it transmits and receives network packets such as ICMP, RIP, BPG, IP and TCP. A WAN port in one embodiment supports network security with VPN and IPSec that requires additional hardware components.

Since OC-192 results in a faster wire speed, a faster SPU will be required in embodiments that support OC-192.

Switch-Based Storage Operations

One of ordinary skill in the art will have a general knowledge of the iSCSI and FC protocols. However, for more information on iSCSI refer to "draft-ietf-ips-iSCSI-20.txt," an Internet Draft (see www.ietf.org) and work in progress by the Internet Engineering Task Force (IETF), Jan. 19, 2003, incorporated herein by reference in its entirety. For more information about Fibre Channel (FC) refer to "SCSI Fibre Channel Protocol-2 (FCP-2)", Nov. 23, 2002, Rev: 08 (see www.t10.org), incorporated herein by reference in its entirety. In addition, both are further described in U.S. patent application Ser. No. 10/051,321, entitled STORAGE SWITCH FOR STORAGE AREA NETWORK, filed Jan. 18, 2002.

Storage Pools

As shown in FIG. 1, in its physical configuration, a system in accordance with an embodiment of the invention includes a switch 104 coupled to one or more servers 102 and to one or more physical devices 106, i.e., storage devices or subsystems. Each physical target is comprised of one or more logical units (LUs) 107. It is from these LUs that virtual targets or VLUs will ultimately be formed.

Before a virtual target can be created, or "provisioned," the switch needs to be "aware" of the physical storage devices attached and/or available for access by it as well as the characteristics of those physical storage devices. Accordingly, in one embodiment of the invention, when a storage device or an initiator device is connected to or registered with the switch, the switch must learn about the performance characteristics of the new device. Once a device is "discovered," various inquiries are sent to the device to gather information regarding performance characteristics. For instance, read/write commands can be sent to measure transfer rate or to check access time. Alternatively, in some embodiments, the obtaining of performance characteristics can be done by having an administrator enter the performance characteristics at a management station 110, wherein the characteristics can then be provided to a switch 104.

Based on the information gathered about the device, all of which is generally invisible to the end user, in one embodiment of the invention the switch classifies the device based on a policy. Once a policy has been determined for a storage device, the LUs for the device are assigned to a storage pool 802, sometimes referred to herein as a "domain." Since each storage device is comprised of one or more LUs, all the LUs of a particular storage device are assigned to the same pool. However, in one embodiment, each LU is considered by the switch as a separate storage node and each LU is described by an LU object in the SCC database. Thus, each pool has as members the LUs. In one embodiment, assignment to a pool is done independent of the protocol under which the physical storage device operates, e.g., iSCSI or Fiber Channel. As will be understood by those of skill in the art, each pool is defined in a switch by a listing for the pool of the LUs assigned to it, which listing is stored in the SCC database in one embodiment. Such a listing may be comprised of pointers to the LU objects.

Generally each pool will be accessible only to users with particular characteristics. For example, a storage pool may be established for those users located in a Building 1, where the pool is entitled "Building 1 Shared Gold Storage Pool." Another exemplary pool may be entitled "Engineering Exclusive Silver Storage Pool" and may be exclusively accessible by the engineering team at a particular company. Of course an infinite variation of pools could be established and those described and illustrated are exemplary only.

In addition, in an embodiment, there are two special pools: a "Default Pool" and a "No Pool." A Default Pool allows access to anyone with access to the storage network. A "No Pool," in contrast, is not generally accessible to users and is only accessible to the switch itself or to the system administrator. Once assigned to a pool, the LUs can be reassigned to different pools by the switch itself or by a system administrator. For instance, an LU may initially be placed in the No Pool, tested, and then later moved to the default pool or other pool.

Provisioning a Virtual Target

Figure 4:
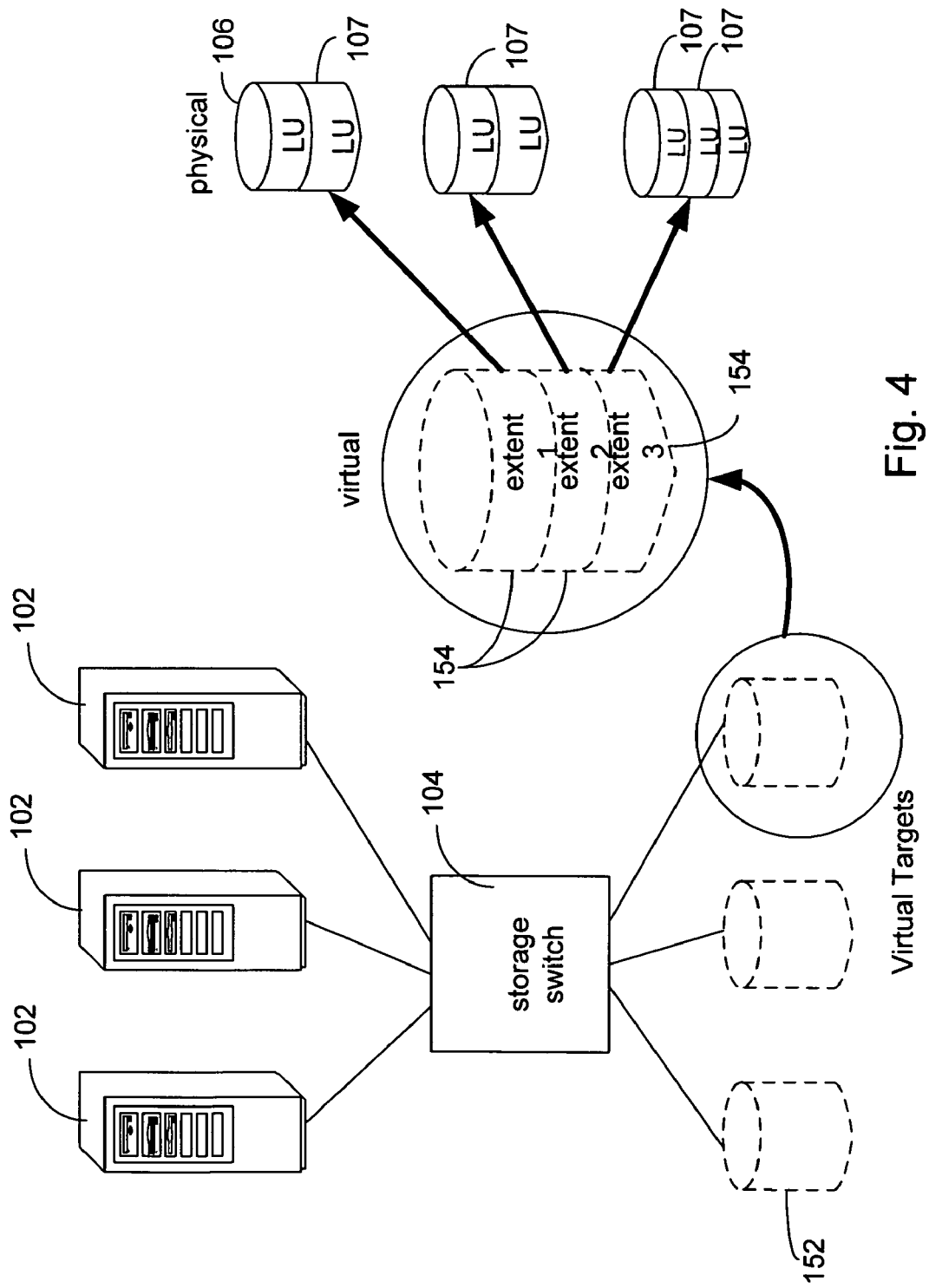
FIG. 4 is a generalized functional block diagram illustrating virtual targets as can be seen by an initiating device.

Once the LUs for physical devices are in an accessible pool (i.e., not the "No Pool"), then a virtual target or VLU can be created from those LUs. Once created, as shown in FIG. 4, the servers (and their respective users) will "see" one or more virtual targets or VLUs 152, each comprised of one or more extents 154, but they will not necessarily "see" the physical devices 106. An extent is a contiguous part of or a whole LU from a physical device. As shown in the example of FIG. 4, each extent in the example virtual target 152 is formed from entire LUs from several physical devices. "Extent" may still be referenced by an LUN from an initiator, such as a server, which doesn't realize a target is "virtual." The composition of the virtual targets, including protocols used by the LU is irrelevant to the server. However, as shown in FIG. 4, each virtual target is comprised of extents that map to the LUs of physical devices 106.

To provision a virtual target, a user selects several characteristics for the virtual target in one embodiment including:
   the size (e.g., in Gigabytes);
   a storage pool, although in one embodiment the user may select only from the storage pools which the user is permitted to access;
   desired availability, e.g., always available (data is critical and must not ever go down), usually available, etc.;
   the WWUI of the virtual target;
   a backup pool;
   user authentication data;
   number of mirrored members;
   locations of mirrored numbers (e.g., local or remote).

Still in other embodiments of the invention, different, additional, or fewer characteristics can also be selected.

The switch then analyzes the available resources from the selected pool to determine if the virtual target can be formed, and in particular the switch determines if a number of LUs (or parts of LUs) to meet the size requirement for the virtual target are available. If so, the virtual target is created with one or more extents and a virtual target object is formed in the SCC database identifying the virtual target, its extents, and its characteristics. Examples of user-selected characteristics for various virtual targets can be found in U.S. patent application Ser. No. 10/051,396, entitled VIRTUALIZATION IN A STORAGE SYSTEM, filed Jan. 18, 2002.

Provisioning an Initiator Connection

When a server or other initiator is connected to a switch and the initiator supports iSNS or SLP, in one embodiment the initiator will register itself with the switch, resulting in an initiator object stored in the SCC database. In other embodiments, however, the switch will include an access provisioning function which creates, updates, or deletes an initiator connection.

In creating the access connection—the connection between the switch and an initiator (such as a server)—a user will specify various parameters such as, for example, the server WWUI, connection detail, such as protocol (e.g., GigE or Fiber Channel), exclusive or shared, source and destination IP addresses, minimum and maximum percentage of bandwidth, # of connections required by the server, access security, read only or read/write, and VPN enabled, etc.

Some or all of the user specified information is saved in an initiator object stored in the SCC database. When the connection is removed, the initiator object will be deleted.

The switch, the management station, or other network management then creates a storage pool for the particular connection, specifying the LUs available to the initiator to form virtual targets.

User Domains

Like physical devices, virtual targets can be assigned to a pool accessible only to those with specified characteristics. Thus, like physical devices, virtual targets can be assigned to a user-specific domain (sometimes referred to herein as the User's Domain), a default domain (accessible to anyone), or a No Domain. Each domain will be identified, in one embodiment, by an object in the SCC database that includes a listing of all the virtual targets assigned to the domain. For virtual targets, the No Domain may include spare virtual targets, members of mirrored virtual targets, or remote virtual targets from another switch. Essentially, the virtual target No Domain is a parking place for certain types of virtual targets. For ease of description, when referring to virtual targets, pools will be referred to herein as "domains," but when referencing physical devices, pools will continue to be referred to as "pools." It is to be understood, however, that conceptually "pools" and "domains" are essentially the same thing.

Once an initiator connection is provisioned, as described above, a virtual target is provisioned that meets the initiator's requirements and placed into an accessible pool for the initiator or a previously provisioned virtual target is made accessible to the initiator, e.g., by moving the virtual target to the initiator's user domain from another domain such as the No Domain or Default Domain. (Note that either the virtual target or the initiator connection can be provisioned first—there is no requirement that they be provisioned in a particular order). Then, once an initiator requests access to the virtual target, e.g., by sending a read or write request, both the virtual target object and initiator object are read from the SCC database and information regarding the initiator connection and virtual target is passed to the relevant linecard(s) for use in processing the requests.

Figure 5B:
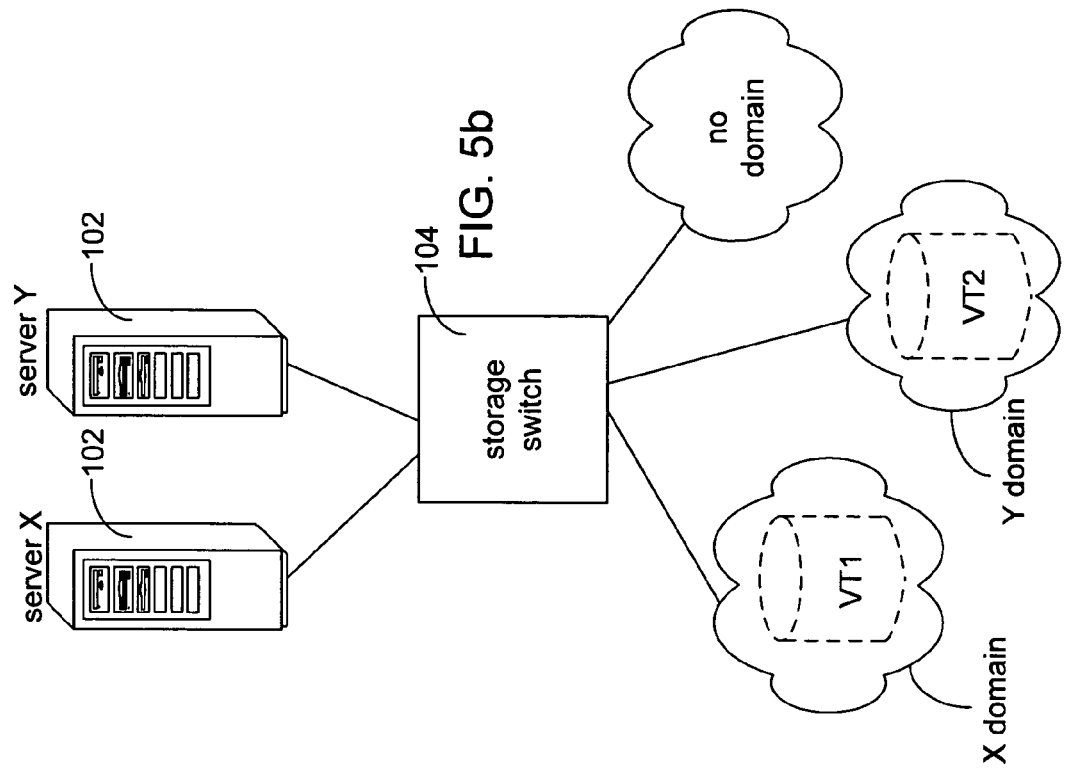
Figure 5A:
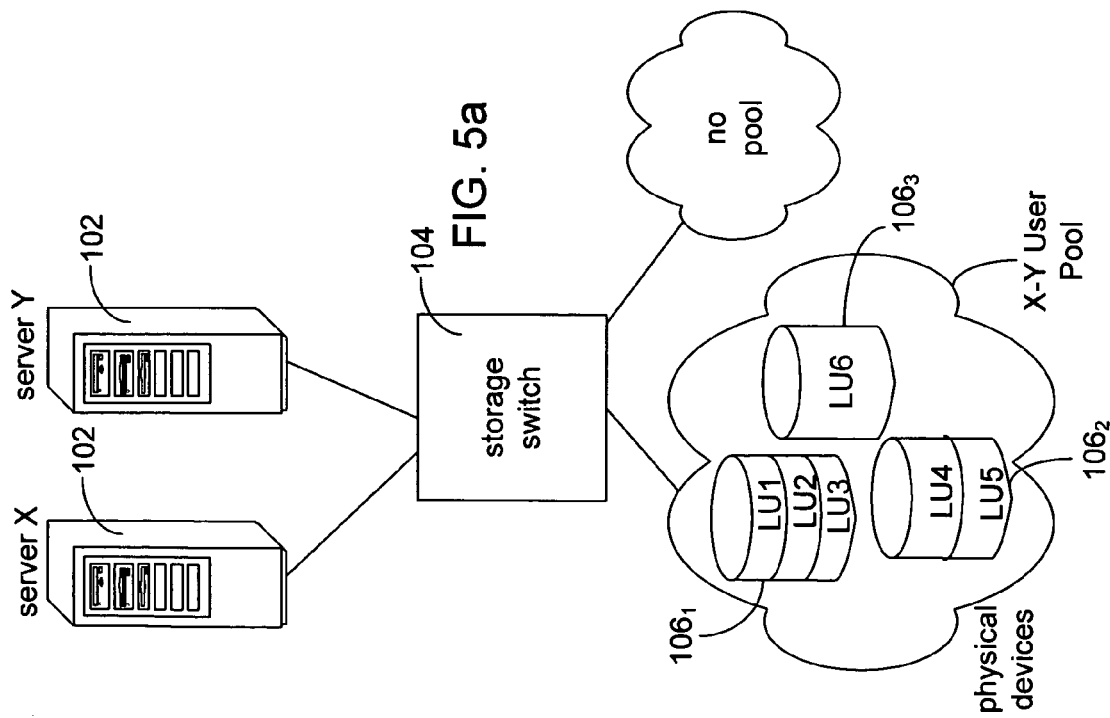

FIGS. 5a-5c illustrate one example of provisioning virtual targets in a storage area network. The system of FIGS. 5a-5c includes three physical devices $106_1$, $106_2$, and $106_3$, having a total of 6 LUs—LU1, LU2, LU3, LU4, LU5, LU6. In FIG. 5a, each physical device is coupled to a switch and placed in a pool accessible to two initiators X and Y, the "X-Y User Pool."

If initiator X and initiator Y each require one virtual target, then in one embodiment, the LUs are provisioned to form virtual targets VT1 and VT2, where VT1 includes as extents LUs 1-3 and VT2 includes as extents LUs 4-6 as depicted in FIG. 2b. VT1 is placed in the server X user domain and VT2 is placed in the server Y user domain. Initiator X will have access to VT1 but no VT2, while initiator Y will have access to VT2 but not VT1.

If instead, for example, initiator Y requires a mirrored virtual target M with a total of 6 LUs, VT1 and VT2 can be created as members of the virtual target M. VT1 and VT2 can be placed in the switch's No Domain (a domain where the physical targets are not directly accessible to users) while M is made accessible to Y, as shown in FIG. 2c. As members of M, VT1 and VT2 will not be independently accessible. VT1 is comprised of a LUs 1-3 (physical device $106_1$), while VT2 is comprised of LUs 4-6 (physical devices $106_2$ and $106_3$). When a request is received to write data to the virtual target M, switch 104 will route the incoming data to both VT1 (physical device $106_1$) and VT2 (physical device $106_2$ and/or $106_3$), thus storing the data in at least two physical locations.

Objects

As discussed above, each virtual target, each initiator connection, and each physical device is identified in the SCC database with information included in an object for the respective entity. Each virtual target object and physical target object will include a listing of extents or LUs that comprise it. An example of a Virtual Target object, in one embodiment of the invention, includes the following information:

entity type
entity identifier
managing IP address
time stamp and flags
ports
domain information
SCN bit map
capacity and inquiry information
number of extents
list of extents
extent locator
virtual mode pages
quality of service policy (e.g., the first three entries of Table 4)
statistics—usage, error, and performance data
SLA identifier A physical target (or LU) object may include similar information. More information regarding VTD information can be found in U.S. patent application Ser. No. 10/051,396, entitled VIRTUALIZATION IN A STORAGE SYSTEM, filed Jan. 18, 2002.

Virtualization

Exemplary ingress and egress processes for various packet types are described for explanatory purposes only. It will be understood that numerous processes for various packet types can be used in accordance with various embodiments. In one embodiment, after an incoming packet is classified as data or control traffic by the PPU, the PPU can perform virtualization for data packets without data buffering. For each packet received, the PPU determines the type of packet (e.g., command, R2T/XFER_RDY, Write Data, Read Data, Response, Task Management/Abort) and then performs either an ingress (where the packet enters the switch) or an egress (where the packet leaves the switch) algorithm to translate the virtual target to a physical target or vice versa. Thus, the virtualization function is distributed amongst ingress and egress ports. To further enable wire-speed processing, virtual descriptors are used in conjunction with a CAM, to map the request location to the access location. In addition, for each packet there may be special considerations. For instance, the virtual target to which the packet is destined may be spaced over several noncontiguous extents, may be mirrored, or both.

Command Packet—Ingress

Figure 6:
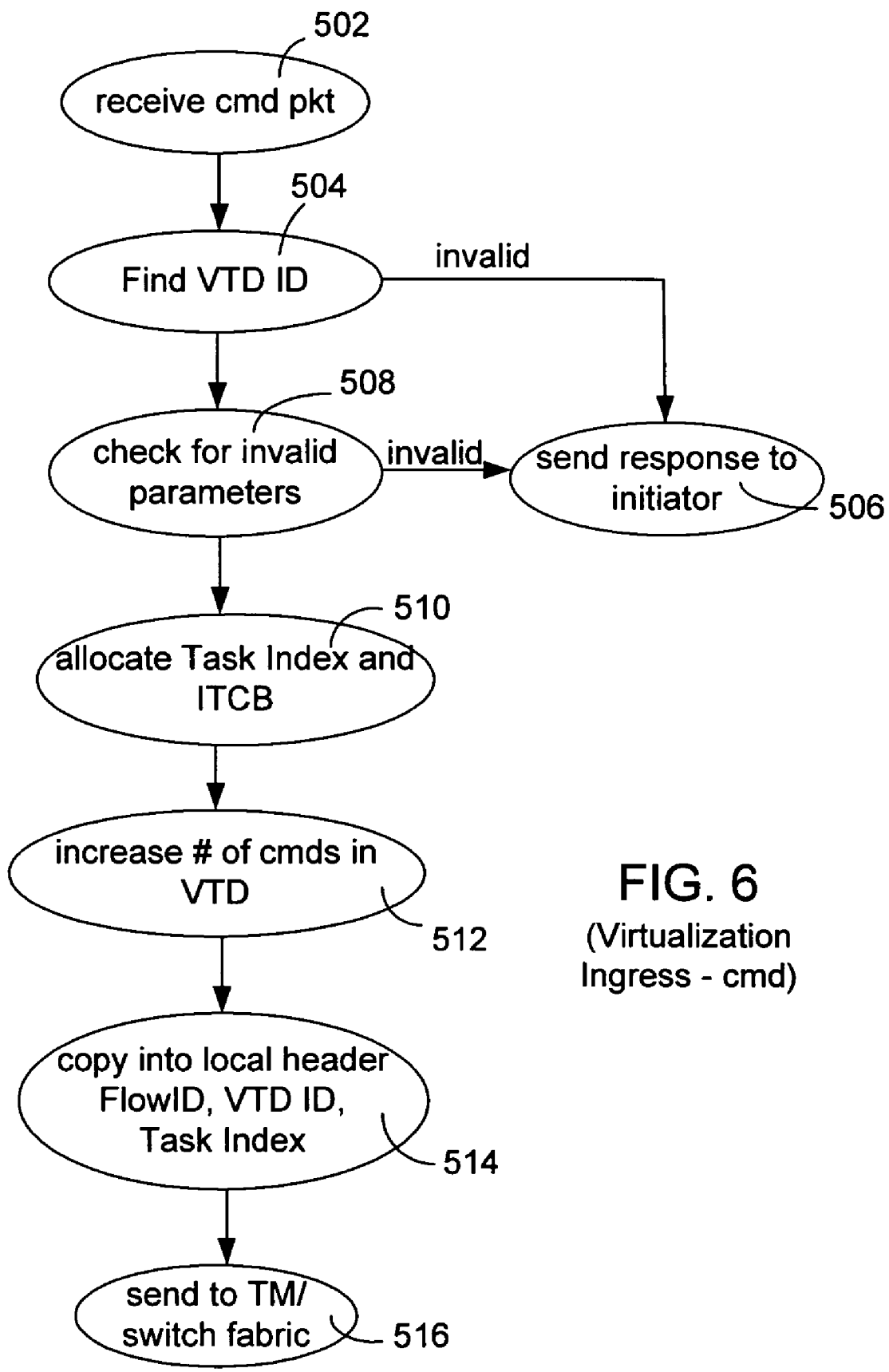
FIG. 6 is a is a flowchart illustrating a virtualization process in the ingress direction for command packets or frames, in accordance with one embodiment.

To initiate a transfer task to or from the virtual target, a SCSI command is sent by an iSCSI or FC initiator in an iSCSI PDU or FCP IU, respectively. Referring to FIG. 6, when such a packet is received at the PPU (after classification), step 502, the PPU CAM is next checked to determine if a valid VTD ID exists, using the TCP Control Block Index and the logical unit number (LUN), in the case of an iSCSI initiator, or the S_ID (an identification of the source of the frame) and the LUN, in the case of an FC initiator, step 504. The LUNs in each case are found in the respective iSCSI PDU or FCP IU. If no valid VTD ID is found, then a response packet is sent back to the initiator, step 506. If a valid VTD is found, then a check is made for invalid parameters, step 508. If invalid parameters exists, a response packet is sent back to the iSCSI or FC initiator, step 506.

A Task Index is allocated along with an Ingress Task Control Block (ITCB), step 510. The Task Index points to or identifies the ITCB. The ITCB stores the FlowID (obtained from the VTD), the VTD ID, command sequence number or CmdSN (from the iSCSI packet itself), as well as an initiator (originator) identification (e.g., the initiator_task_tag sent in the iSCSI PDU or the OX_ID in the FCP frame header). The OX_ID is the originator (initiator) identification of the exchange. The ITCB is stored in the PPU SRAM. Of course there may be many commands in progress at any given time, so the PPU may store a number of ITCBs at any particular time. Each ITCB will be referenced by its respective Task Index.

The VTD tracks the number of outstanding commands to a particular virtual target, so when a new ITCB is established, it increments the number of outstanding commands, step 512.

In some embodiments, VTDs establish a maximum number of commands that may be outstanding to any one particular virtual target. The FlowID, the VTD ID, and the Task Index are all copied into the local header, step 514. The FlowID tells the traffic manager the destination linecards and ports. Later, the Task Index will be returned by the egress port to identify a particular task of a packet. Finally, the packet is sent to the traffic manager and then the routing fabric, so that it ultimately reaches an egress PPU, step 516.

When a virtual target is composed of multiple extents, there are multiple FlowIDs identified in the VTD, one for each extent. The PPU checks the block address for the packet and selects the correct FlowID. For example, if a virtual target has two 1 Gb extents, and the block address for the command is in the second extent, then the PPU selects the FlowID for the second extent. In other words, the FlowID determines the destination/egress port. If a read command crosses an extent boundary, meaning that the command specifies a starting block address in a first extent and an ending block address in a second extent, then after reading the appropriate data from the first extent, the PPU repeats the command to the second extent to read the remaining blocks. For a write command that crosses an extent boundary, the PPU duplicates the command to both extents and manages the order of the write data. When a read command crosses an extent boundary, there will be two read commands to two extents. The second read command is sent only after completing the first to ensure the data are returned sequentially to the initiator.

Command Packet—Egress

Figure 7:
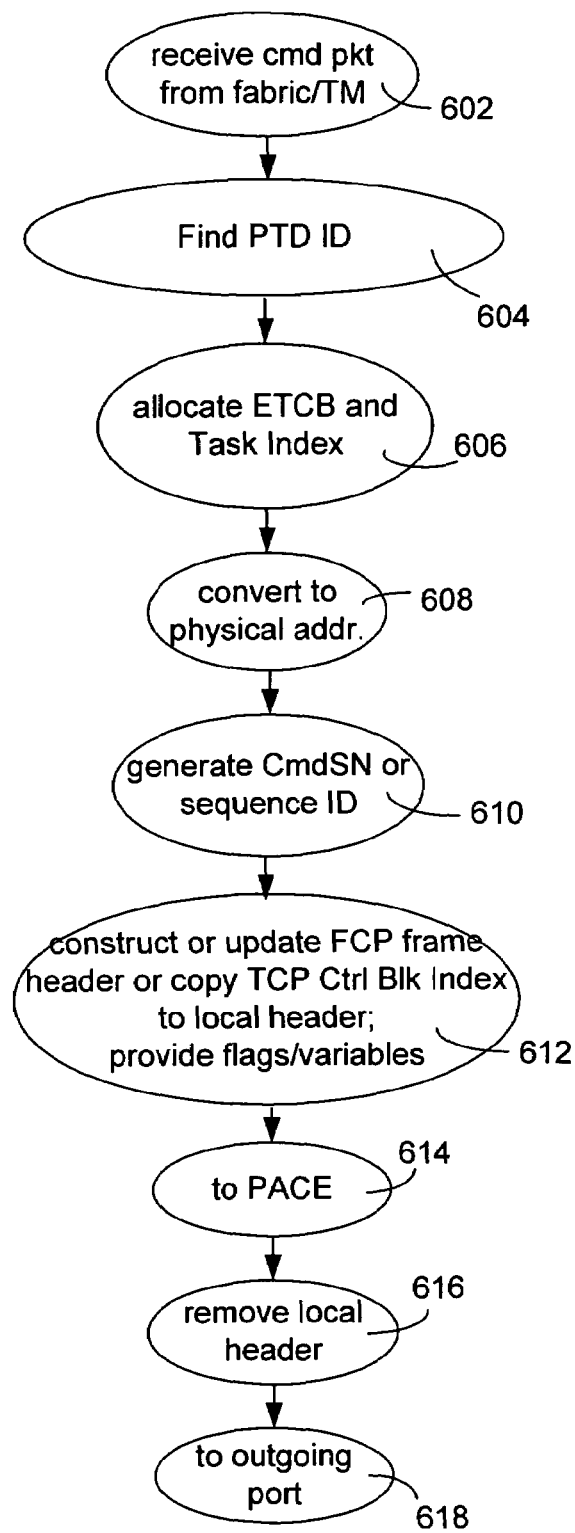
FIG. 7 is a flowchart illustrating a virtualization process in the egress direction for command packets or frames, in accordance with one embodiment.

Referring to FIG. 7, after a command PDU or IU has passed through the switch fabric, it will arrive at an PPU, destined for an egress port, step 602. The PPU attempts to identify the physical device(s) that the packet is destined for, step 604. To do so, the VTD ID from the local header is used to search the PPU CAM for a PTD ID (Physical Target Descriptor Identifier). The VTD ID is affiliated with and indexes a particular PTD ID associated with the particular egress PPU. PTDs are stored in the PPU SRAM, like VTDs, and also contain information similar to that found in a VTD. If the search is unsuccessful, it is assumed that this is a command packet sent directly by the CPU and no additional processing is required by the PPU, causing the PPU to pass the packet to the proper egress port based on the FlowID in the local header. If the search is successful, the PTD ID will identify the physical target (including extent) to which the virtual target is mapped and which is in communication with the particular egress linecard currently processing the packet.

The PPU next allocates a Task Index together with an egress task control block (ETCB), step 606. In an embodiment, the Task Index used for egress is the same as that used for ingress. The Task Index also identifies the ETCB. In addition, the ETCB also stores any other control information necessary for the command, including CmdSN of an iSCSI PDU or an exchange sequence for an FCP IU.

Using the contents of the PTD, the PPU converts the SCSI block address from a virtual target to the block address of a physical device, step 608. Adding the block address of the virtual target to the beginning block offset of the extent can provide this conversion. For instance, if the virtual target block sought to be accessed is 1990 and the starting offset of the corresponding first extent is 3000, then the block address of the extent to be accessed is 4990. Next the PPU generates proper iSCSI CmdSN or FCP sequence ID, step 610 and places them in the iSCSI PDU or FCP frame header. The PPU also constructs the FCP frame header if necessary (in some embodiments, after the ingress PPU reads the necessary information from the FCP header, it will remove it, although other embodiments will leave it intact and merely update or change the necessary fields at this step) or for a packet being sent to an iSCSI target, the TCP Control Block Index is copied into the local header from the PTD, step 612. In addition, the PPU provides any flags or other variables needed for the iSCSI or FCP headers. The completed iSCSI PDU or FCP frame are then sent to the PACE, step 614, which in turn strips the local header, step 616, and passes the packet to appropriate port, step 618.

R2T or XFER RDY—Ingress

Figure 8:
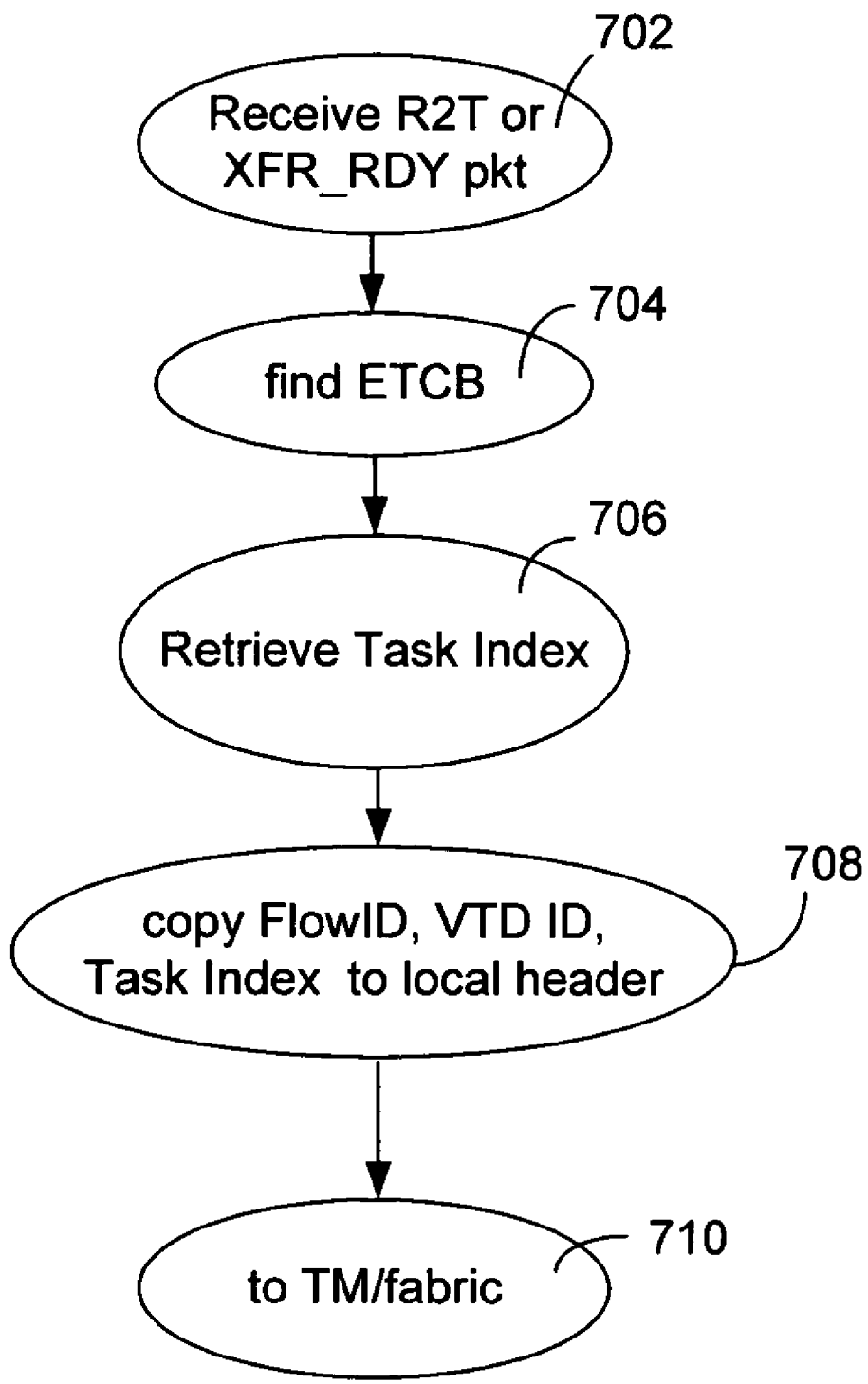
FIG. 8 is a flowchart illustrating a virtualization process in the ingress direction for R2T or XFER_RDY packets or frames, in accordance with one embodiment.

Referring to FIG. 8, after a command has been sent to a target storage device as described above, and the command is a write command, an R2T PDU or an XFER_RDY IU will be received from a storage device when it is ready to accept write data, step 702. The PPU identifies the corresponding ETCB, step 704, by using the initiator_task_tag or OX_ID inside the packet. In some embodiments, the initiator_task_tag or OX_ID of the packet is the same as the Task Index, which identifies the ETCB. If the PPU cannot identify a valid ETCB because of an invalid initiator_task_tag or OX_ID, the packet is discarded. Otherwise, once the ETCB is identified, the PPU retrieves the Ingress Task Index (if different from the Egress Task Index) and the VTD ID from the ETCB, step 1061. The PPU also retrieves the FlowID from the PTD, which is also identified in the ETCB by the PTD ID. The FlowID indicates to the traffic manager the linecard of the original initiator (ingress) port. The FlowID, the VTD ID, and the Task Index are copied into the local header of the packet, step 1062. Finally the packet is sent to the traffic manager and the switch fabric, step 710.

R2T or XFER RDY—Egress

Figure 9:
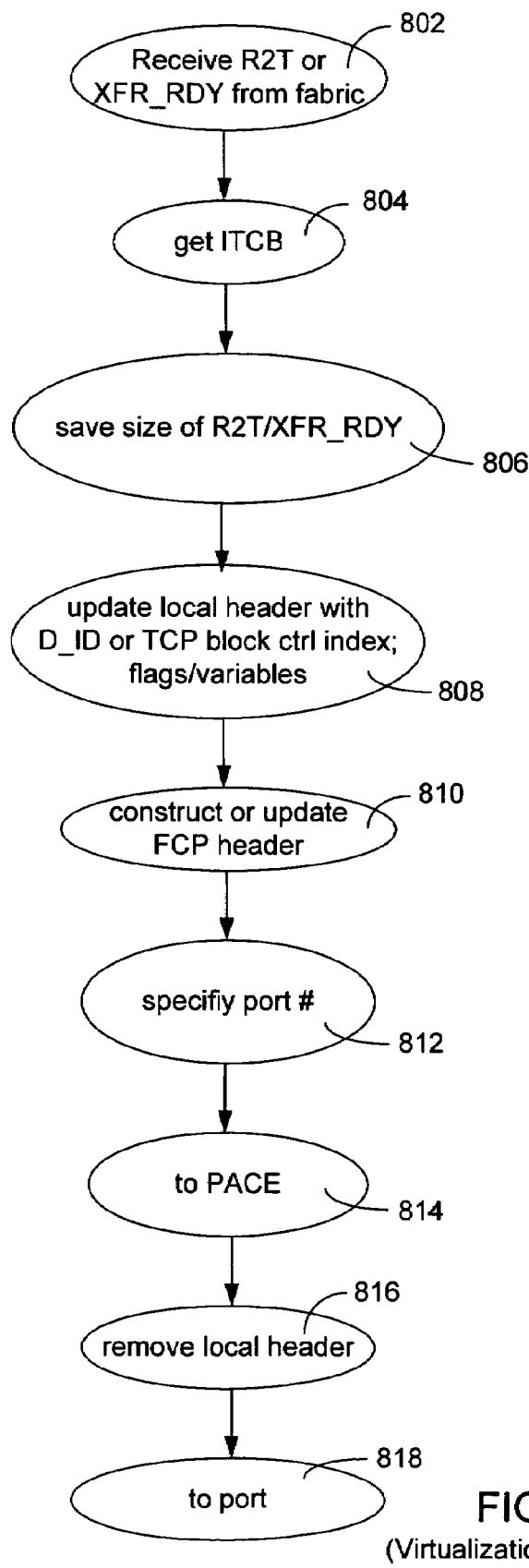
FIG. 9 is a flowchart illustrating a virtualization process in the egress direction for R2T or XFER_RDY packets or frames, in accordance with one embodiment.

Referring to FIG. 9, after the R2T or XFER_RDY packet emerges from the switch fabric, it is received by a PPU, step 802, on its way to be passed back to the initiator (the device that initiated the original command for the particular task). The Task Index identifies the ITCB to the PPU, step 804, from which ITCB the original initiator_task_tag and the VTD ID can be obtained. The R2T/XFER_RDY Desired Data Transfer Length or BURST_LEN field is stored in the ITCB, step 806. The local header is updated with the FCP D_ID or the TCP Control Block Index for the TCP connection, step 808. Note that the stored S_ID from the original packet, which is stored in the ITCB, becomes the D_ID. If necessary, an FCP frame header is constructed or its fields are updated, step 810. The destination port number is specified in the local header in place of the FlowID, step 812, and placed along with the initiator_task_tag in the SCSI PDU or, for an FC connection, the RX_ID and OX_ID are placed in the FCP frame. The RX_ID field is the responder (target) identification of the exchange. The PPU also places any other flags or variables that need to be placed in the PDU or FCP headers. The packet is forwarded to the PACE, step 814, which identifies the outgoing port from the local header. The local header is then stripped, step 816 and forwarded to the proper port for transmission, step 818.

In the event that the command is split over two or more extents, e.g., the command starts in one extent and ends in another, then the PPU must hold the R2T or XFER_RDY of the second extent until the data transfer is complete to the first extent, thus ensuring a sequential data transfer from the initiator. In addition, the data offset of the R2T or XFER_RDY of the second extent will need to be modified by adding the amount of data transferred to the first extent.

Write Data Packet—Ingress

Figure 10:
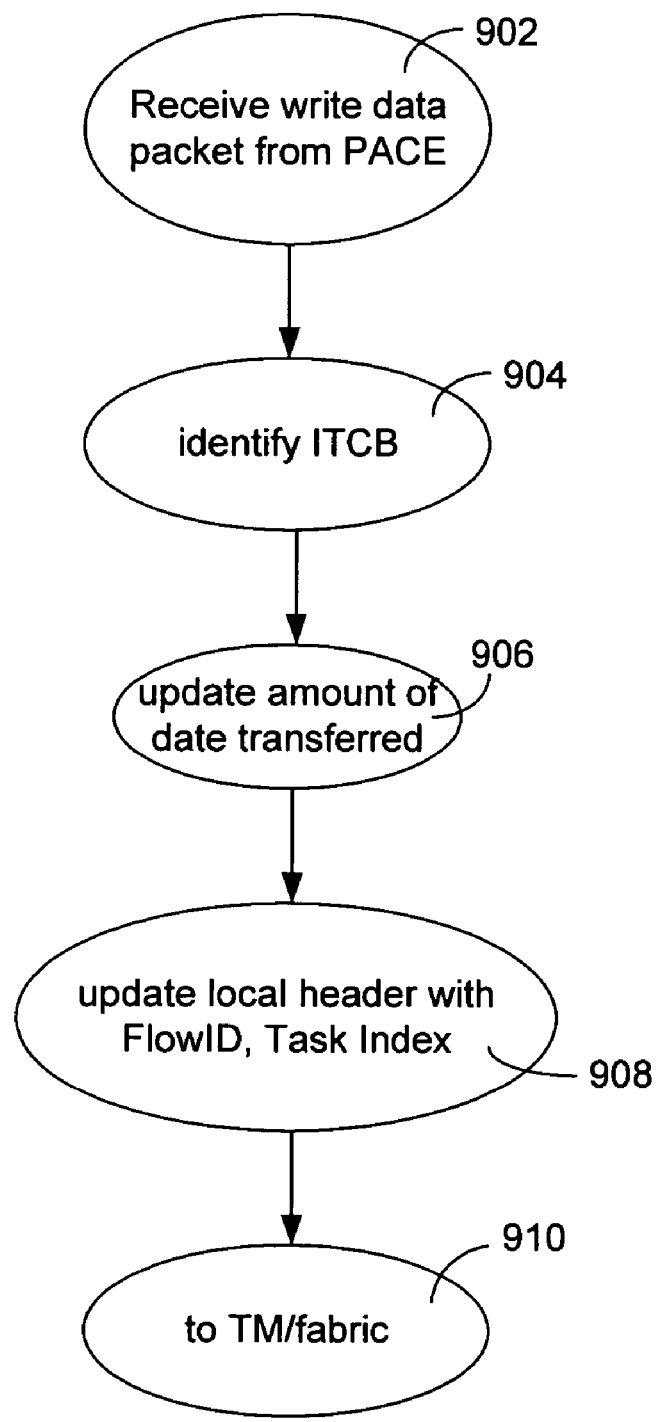
FIG. 10 is a flowchart illustrating a virtualization process in the ingress direction for write data packets or frames, in accordance with one embodiment.

After an initiator receives an R2T or XFER-RDY packet it returns a write-data packet. Referring to FIG. 10, when a write-data iSCSI PDU or FC IU is received from an initiator, step 902, the ITCB to which the packet belongs must be identified, step 904. Usually, the ITCB can be identified using the RX_ID or the target_task_tag, which is the same as the Task Index in some embodiments. The SPU further identifies that received packets are in order. In some circumstances, however, the initiator will transfer unsolicited data: data that is sent prior to receiving an R2T or XFER_RDY. In such a case, the PPU must find the ITCB by a search through the outstanding tasks of a particular virtual target. But if the ITCB is not found, then the packet is discarded. If the ITCB is found, the total amount of data to be transferred is updated in the ITCB, step 906. The FlowID and Task Index are added to the local header of the packet, step 908. The packet is then forwarded to the traffic manager and ultimately to the switch fabric, step 910.

Write Data Packet—Egress

Figure 11:
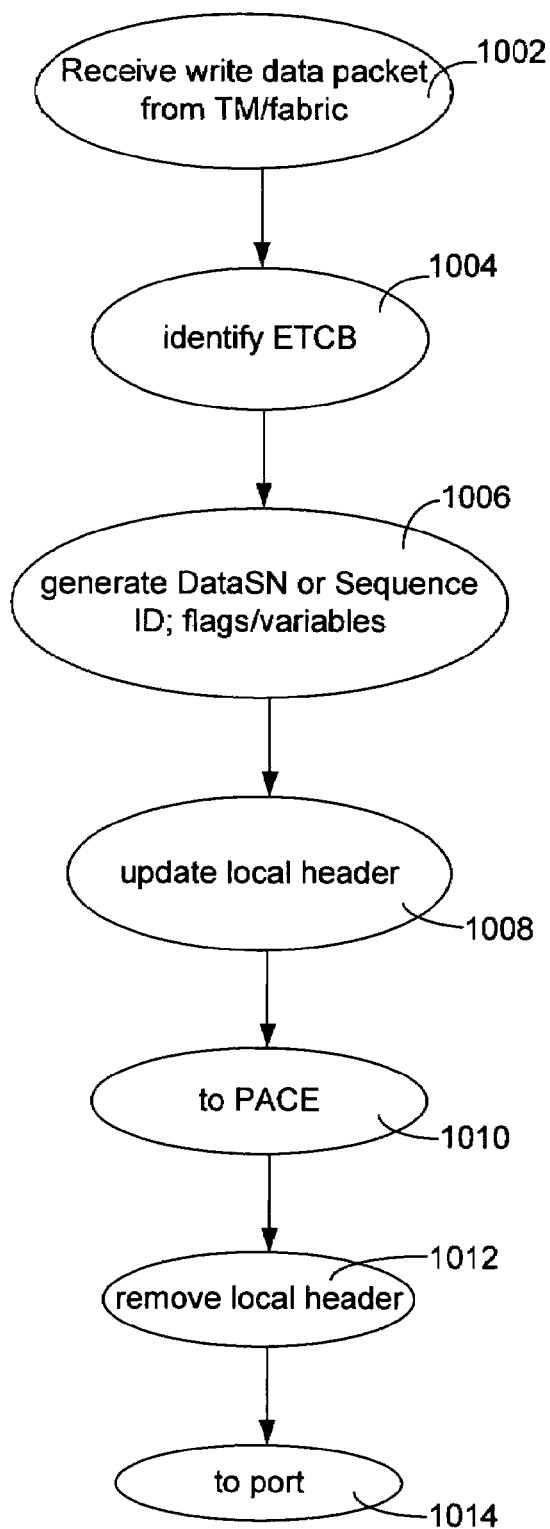
FIG. 11 is a flowchart illustrating a virtualization process in the egress direction for write data packets or frames, in accordance with one embodiment.

Referring to FIG. 11, when a write-data packet is received from the switch fabric (via the traffic manager), step 1002, the ETCB for the packet needs to be identified, step 1004. Typically, the ETCB can be identified using the Task Index in the local header. Once the ETCB is found, using the information inside the ETCB, the PPU generates proper iSCSI DataSN or FCP sequence ID, step 1006, along with any other flags and variables, e.g, data offset, for the PDU or FCP frame header. The local header is updated with the TCP Control Block Index or the FCP D_ID from the PTD, step 1008. The port number is also added to the local header. The finished iSCSI PDU or FCP frame is sent to the PACE, step 1010, which removes the local header, step 1012, and forwards the packet to the appropriate port, 1014.

Initial Mirror Synchronization

A mirrored virtual target (or mirrored VLU) maintains data in two or more physical locations for improved reliability in data storage. When a mirrored virtual target is initially provisioned, the data stored in each member of the virtual target must be synchronized. Accordingly, an initial mirror synchronization operation can be performed to synchronize the data between each of the physical target members of the mirrored virtual target. In one embodiment, the data can be synchronized by establishing one target member as a primary (source) target. The data of the primary target can then be written to each of the other target members of the mirrored virtual target. After the data of the primary source target is written to each of the destination targets, an initial state of the virtual target is established and the virtual target can be said to be mirrored, with each target member storing an identical set of data for the mirrored virtual target.

Although the present disclosure often refers to the initial mirror synchronization as being performed upon an initial provisioning of a mirrored virtual target, such need not be the case. An initial mirror synchronization can be performed at anytime. For example, after determining that one or more targets of a mirrored virtual target have become unsynchronized for some reason, an initial mirror synchronization can be performed. In another example, an initial mirror synchronization could be performed at a desired instance to ensure the synchronization of the mirrored target's members.

Figure 12:
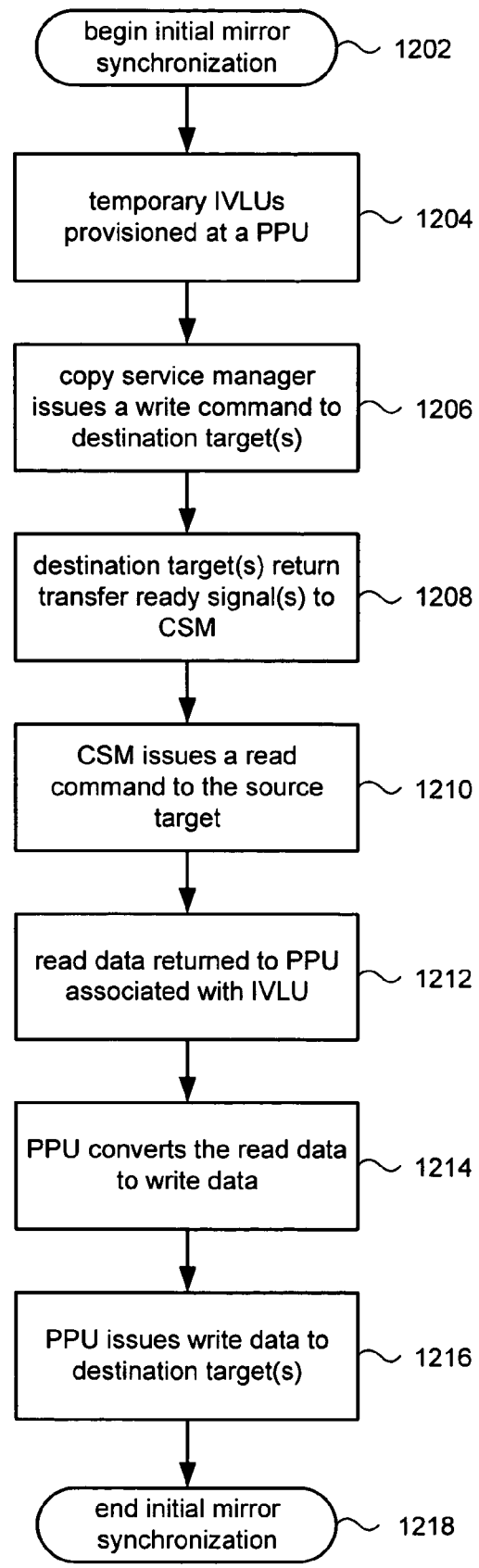
FIG. 12 is a flowchart of an initial mirror synchronization process in accordance with one embodiment.
Figure 13:
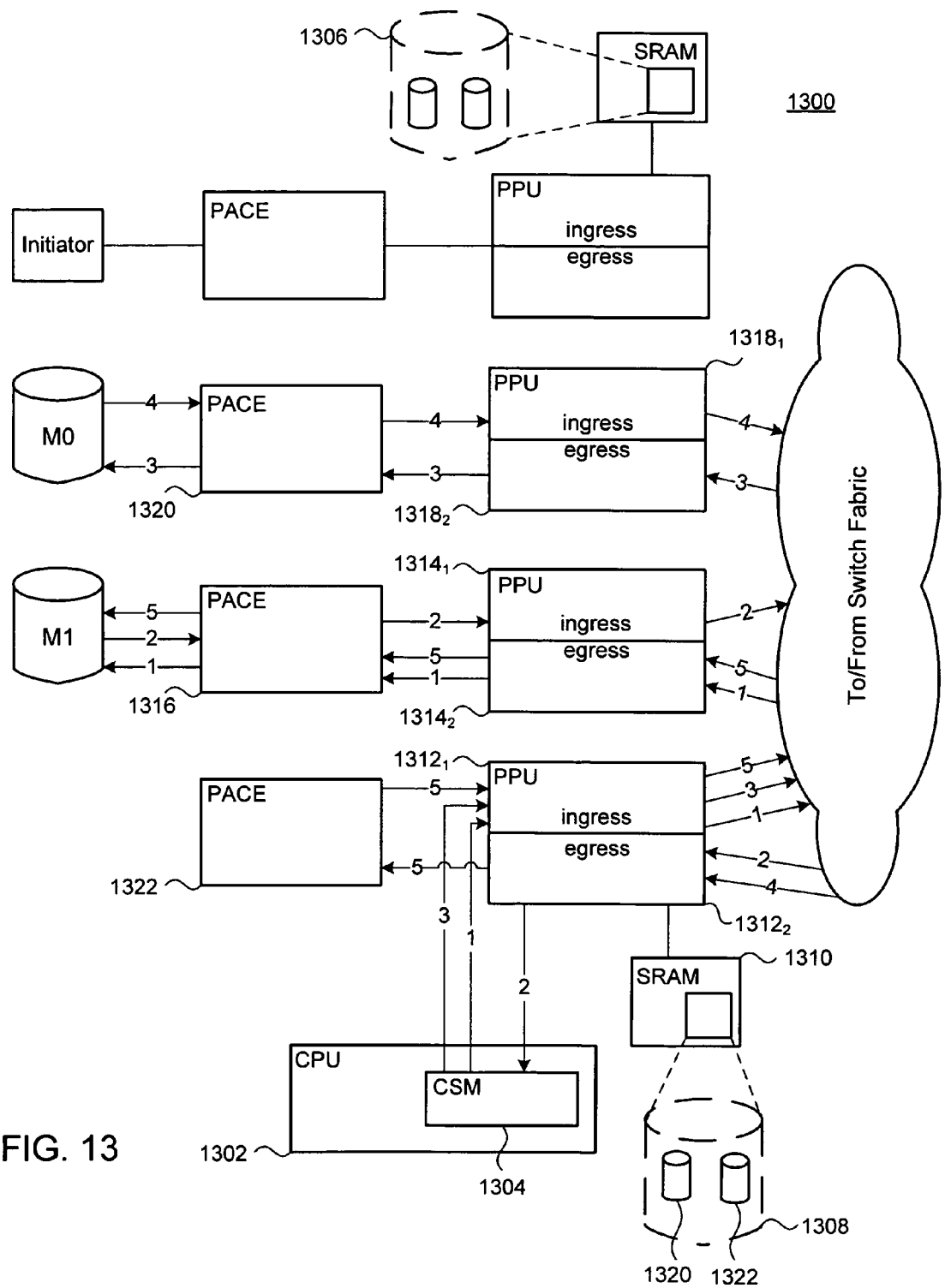
FIG. 13 is a generalized block diagram including a storage switch and a command flow that can be used to synchronize the members of a mirrored virtual target in accordance with one embodiment.

An initial mirror synchronization of a mirrored virtual target in accordance with one embodiment will be described with respect to FIG. 12 and FIG. 13. FIG. 12 is a flowchart of an initial mirror synchronization process in accordance with one embodiment and FIG. 13 is a simplified block diagram including a storage switch 1300 and a command flow that can be used to synchronize the members of a mirrored virtual target. Many components of storage switch 1300 have been omitted from FIG. 13 for clarity of discussion, their operation having been heretofore described. A storage switch in accordance with one embodiment as depicted in FIG. 13 can include a central processing unit 1302. CPU 1302 can include a copy service manager (CSM) 1304 to manage the initial mirror synchronization in one embodiment. CSM 1304 can include in various embodiments one or more software modules, components, or sets of instructions that can perform the functionality substantially as described herein. CSM 1304 can include dedicated hardware and/or can include hardware that is programmed by software stored on one or more storage devices such as non-volatile memory (e.g. flash memory, EEPROM, etc.) or other memory devices.

At step 1202 of FIG. 12, an initial mirror synchronization of a virtual target begins, for example, in response to a user provisioning a mirrored virtual target as previously described. For example, a user may provision a virtual logical unit 1306, illustrated in FIG. 13, that has as members, physical targets M0 and M1. Physical targets M0 and M1 can be physical LUs of one or more physical devices. Two physical targets as members of a virtual target are presented herein for exemplary purposes only. Virtual targets in accordance with embodiments can include any number of physical target members.

To begin the initial synchronization of the physical targets corresponding to provisioned VLU 1306, an internal virtual target (IVT) is created at step 1204. For example, CSM 1304 can create an IVT 1308, which is stored in memory 1310 and accessible to PPU 1312. IVT 1308 can be provisioned to include a first internal virtual logical unit (IVLU) corresponding to a member of the mirrored target 1306 designated as a source for the operation. One or more second IVLUs can be provisioned that correspond to the remaining members of the mirrored target 1306. For example, a source IVLU(0) 1320 is provisioned for the source target M0 and a destination IVLU (1) is provisioned for the destination target M1 in the example presented in FIG. 13. In one embodiment, if VLU 1306 includes 3 or more member targets, separate IVLUs can be provisioned for each corresponding target (destination) member of the mirrored target. In another embodiment, each destination target can be provisioned as a separate member of the same IVLU. In one embodiment, an internal virtual logical unit can be a temporary object created or provisioned for the initial mirror synchronization operation. After the synchronization operation is complete, the IVLU can be discarded. CPU 1302 and CSM 1304 can function as an internal initiator during synchronization to provide read and write commands to IVLU(0) 1320 and IVLU(1) 1322.

Before synchronizing the physical targets, one member of the IVT is designated as the primary member which becomes the source target whose data will be written to each of the other members of the VLU. In one embodiment, a user provisioning VLU 1306 can designate which physical target of the VLU is to be the primary member. In other embodiments, the storage switch can designate one of the members as a default.

In accordance with various embodiments, the IVT can be provisioned at any PPU of the storage switch. In the example presented in FIG. 13, IVT 1308 is provisioned at PPU 1312 which is not otherwise associated with the initial mirror synchronization operation. PPU 1312 is not associated with a port connected to either of physical targets M0 or M1. Furthermore, PPU A12 is not associated with the port at which VLU 1306 was initially provisioned. In one embodiment, CSM 1304 includes an algorithm to determine an optimal PPU at which to provision the IVT. The algorithm preferably provisions the IVT at the PPU associated with the primary member of the VLU in one embodiment. If the PPU of the primary member is handling a number of tasks at or over a predetermined number, the IVT can be assigned to another PPU (e.g., the PPU of one of the other virtual target members or another PPU on the linecard of the PPU associated with the primary member). In another embodiment, CSM 1304 chooses the PPU of the storage switch that is processing the least number of tasks.

After provisioning IVT 1308, CSM 1304 issues a write command to the destination target(s) of the mirrored virtual logical unit at step 1206. In the example of FIG. 13, mirrored member M0 of VLU 1306 is the primary member. Accordingly, the write command is first issued to the destination target M1. The command flow for the write command is designated as 1 in FIG. 13. As illustrated, CSM 1304 first issues the write command to IVLU(1) 1322, which is stored in SRAM 1310 and associated with PPU 1312. If there are multiple destination targets, CSM 1304 can issue multiple write commands to individual IVLUs provisioned for each destination target or one or more write commands to individual members of one or more IVLUs provisioned for the destination targets. The write command is received at ingress PPU $1312_1$. PPU 1312 can determine the location (e.g., linecard and port location) of the destination target M1 from a VTD object maintained for IVLU(1) 1322. After determining the location of M1, the write command is forwarded through the switch fabric to PPU 1314 (the PPU associated with destination target M1). For example, PPU 1312 can update header information for the write command to specify the appropriate destination linecard and port. If VLU 1306 includes more than two mirrored members, PPU 1312 determines the location of each of destination targets for the mirrored VLU and forwards the write command to each of those destination targets.

The write command is first sent from the ingress of PPU 1312 to the switch fabric. Components such as traffic managers and interfaces are omitted from FIG. 13 for clarity of discussion. The write command passes through the switch fabric where it is routed to PPU 1314. The write command is received at egress PPU $1314_2$ and is forwarded to PACE 1316. PACE 1316 will forward the command to target M1 which will determine whether a transfer ready signal is available for the write command. If target M1 has an available transfer ready signal, a transfer ready signal (e.g., XFER_RDY information unit or R2T packet unit) is returned to PACE 1316 at step 1208. The command flow for the transfer ready signal is designated 2 in the command flow depicted in FIG. 13. The transfer ready signal is sent from PACE 1316 to PPU $1314_1$ and into the switch fabric where it routed back to PPU $1312_2$. PPU $1312_2$ will return the transfer ready signal to CSM 1304.

CSM 1304 will wait to receive a transfer ready signal from each destination target(s) before issuing a read command to the source target. By first issuing a write command to the destination target(s), a storage switch in accordance with one embodiment can establish an internal flow for the data to be synchronized prior to receiving the data. In this manner, the successful routing of data from source to destination at line speed and without buffering can be ensured. The storage switch waits to receive a transfer ready signal from each of the destination targets before issuing the read command to the source target so that each destination target is available to receive the data from the source target once it is read. In this manner, the storage switch will not have to buffer data read from a source target while waiting for one or more destination targets to return a transfer ready signal. Data can be read from the source target and simultaneously multicast to each destination target.

After receiving transfer ready signals from each destination target(s), CSM 1304 issues a read command to the source target at step 1210. The read command, designated as 3 in the command flow of FIG. 13, is first sent to PPU $1312_1$. PPU $1312_1$ forwards the read command to the switch fabric where it is routed to PPU 1318 which is connected to source target M0. Source target M0 receives the read command from PACE 1320 and returns read data at step 1212. In one embodiment, one or more read data packets are returned at step 1212 in accordance with the smallest data size specified by a transfer ready signal (e.g., burst length or desired data length field) returned by a destination target at step 1208.

The read data, specified as 4 in the command flow depicted in FIG. 13, is forwarded from source target M0, through PACE 1320 and PPU $1318_1$, to the switch fabric. The read data is then routed from the switch fabric to PPU 1312. The read data is received at egress PPU $1312_2$. PPU $1312_2$ converts the read data packet(s) to write data packet(s) at step 1214. In one embodiment, PPU 1312 can update local header information for the packet to indicate that it is a write data packet. In one embodiment, PPU 1318 will retrieve and copy the VTD ID, Task Index, and FlowID from the allocated ETCB into the local header when the read packet is received from the source target M0. When the read data is received at PPU $1312_2$, the ITCB allocated for the write request is referenced to update the read data header information with values corresponding to the allocated ITCB. In FCP-SCSI, for example, the Read frame header fields, including OX_ID, RX_ID, SEQ_ID, SEQ_CNT, and PARAM are converted to values corresponding to the write command ITCB and data stream.

After converting the read data to write data, PPU $1312_2$ forwards the write data to the destination target(s) at step 1216. The write data, designated as 5 in the command flow of FIG. 13, is first sent from PPU $1312_2$ to PACE 1322. PACE 1322 is capable of routing the data received from egress PPU $1312_2$ to ingress PPU $1312_1$. This enables PPU 1312 to forward the write data to the switch fabric where it can be routed to the PPU(s) associated with the destination target(s). PPU 1314 receives the write data from the switch fabric and forwards the data to destination target M1 via PACE 1316.

It will be appreciated by one of ordinary skill in the art if a transfer ready signal is returned from a destination target at step 1208 that specifies a desired data length or burst field length that is less than the entire size of an issued write command to the destination target, steps 1210-1216 can be repeated until all of the data for the write command is provided to the destination target(s). CSM 1304 can issue multiple read commands to the source target in accordance with a burst size specified in a transfer ready signal received from a destination target until a write command is satisfied. Additionally, multiple write commands may be issued to the destination targets in order to synchronize an entire VLU. For example, each write command may be issued for a limited transfer size such as 128K. Accordingly, steps 1206-1216 may be repeated many times in order to synchronize one VLU.

Figure 14:
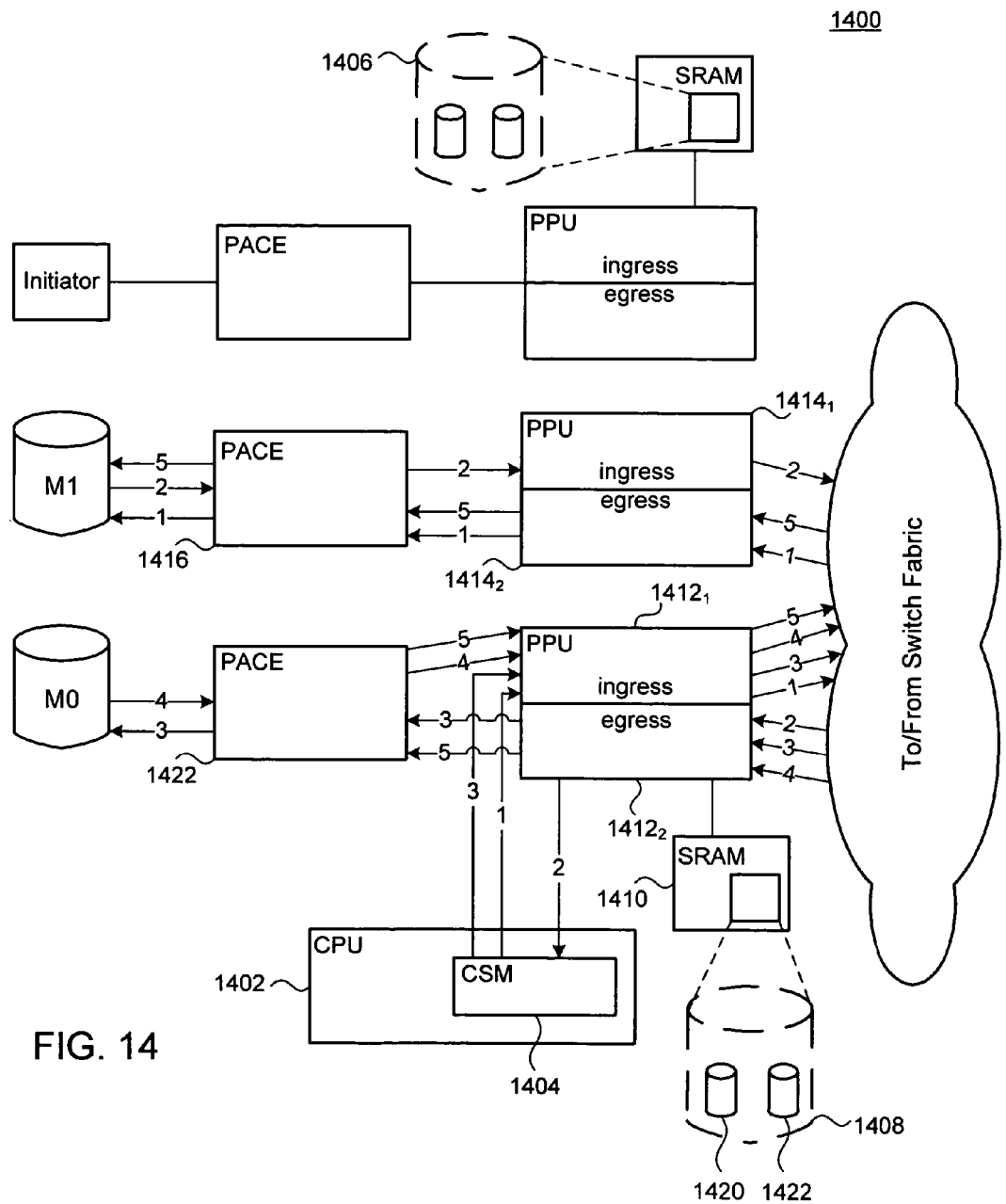
FIG. 14 is a generalized block diagram including a storage switch and a command flow that can be used to synchronize the members of a mirrored virtual target in accordance with one embodiment.

As previously described, an IVT can be provisioned at any PPU of the storage switch at step 1204 to perform an initial mirror synchronization. FIG. 14 is a simplified block diagram including a storage switch 1400 and depicting a command flow in an implementation with the IVT provisioned at the PPU associated with the primary target member (source target). To begin synchronizing the data of the mirrored target members, CSM 1404 first issues a write command, designated as 1 in the command flow of FIG. 14, to the destination target M1. The write command is first provided to ingress PPU $141_1$ which is associated with source target M0. PPU $1412_1$ forwards the command to the switch fabric where it is routed through egress PPU $1414_2$ and PACE 1416 to destination target M1. When destination target M1 is available to receive write data, it will return a transfer ready signal to storage switch 1400. The transfer ready signal, designated as 2 in the command flow of FIG. 14, is routed from PPU $1414_1$ through egress PPU $1412_2$, and back to CSM 1404. CSM 1404 will issue a read command to the source member when a transfer ready signal has been returned from each of the destination target(s) of the mirrored target. CSM 1404 provides a read command, designated as 3 in the command flow of FIG. 14, to ingress PPU $1412_1$ which forwards the command to the switch fabric. The destination of the read command (which can be specified in a FlowID copied into a local header of the read command) will direct the traffic managers to route the command to the linecard and port to which PPU 1412 is associated. The read command will then be routed from the switch fabric, through egress PPU $1412_2$, and on to source target M0. Source target M0 will then return one or more read data packets, designated as 4 in the command flow of FIG. 14, to PACE 1422 which forwards the packet to ingress PPU $1412_1$. The read data passes from ingress PPU $1412_1$, through the switch fabric, and on to egress PPU $1412_2$. At egress PPU $1412_2$, the read data is converted to write data, designated as 5 in the command flow of FIG. 14, and then forwarded back to PACE 1422. As previously described, PACE 1422 can return the write data packet to PPU $1412_1$ where it forwarded to the switch fabric, through egress PPU $1414_2$ and PACE 1416 to destination target member M1.

Mirror Synchronization Verification

In addition to synchronizing the members of a mirrored virtual target, a storage switch in accordance with various embodiments can verify that the members of a mirrored virtual target are synchronized. To verify that the members of a mirrored virtual target are synchronized, the data of one member target is read and compared with that of the other member targets. A storage switch in accordance with one embodiment can verify that the members of a mirrored virtual target are synchronized at line speed and without buffering data read from the source target and compared with the data of the other member target(s).

Figure 15:
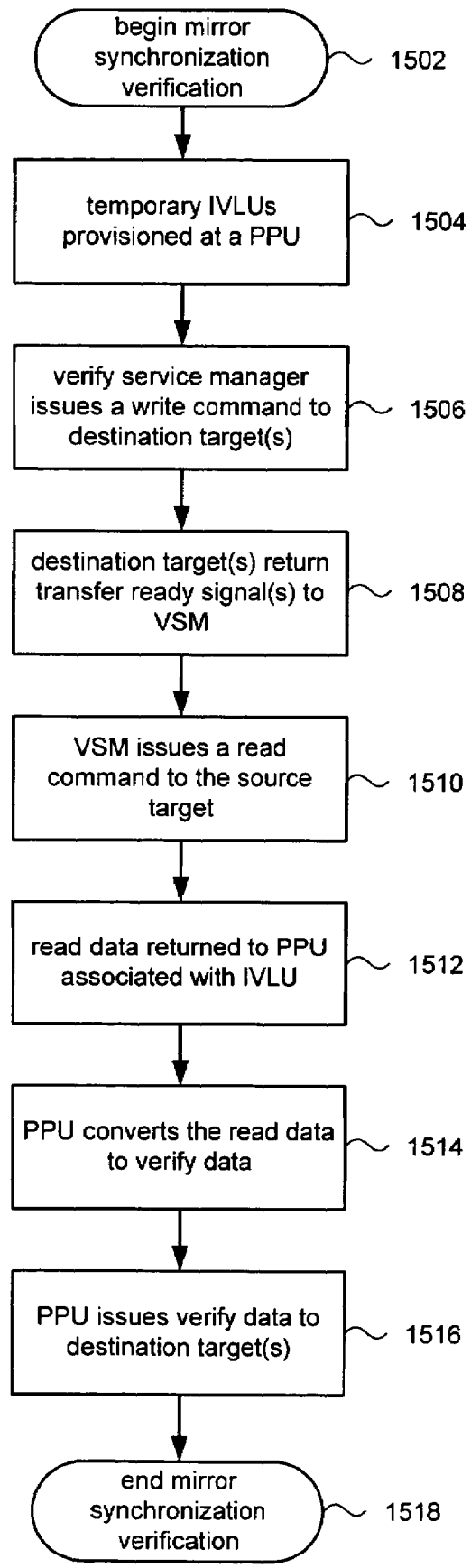
FIG. 15 is a flowchart in accordance with one embodiment for verifying that the members of a mirrored virtual target are synchronized.
Figure 16:
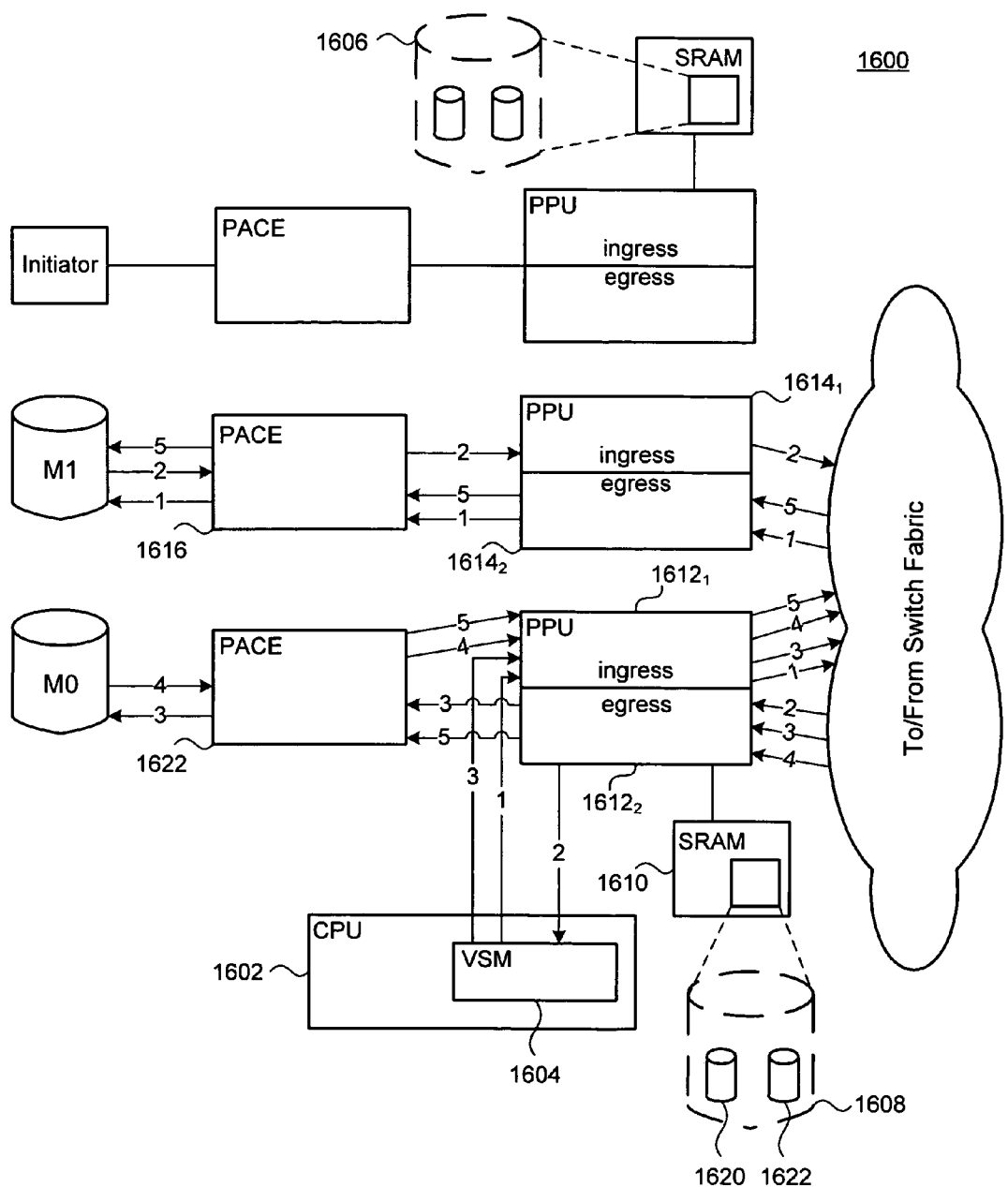
FIG. 16 is a generalized block diagram including a storage switch and a command flow to verify that a mirrored virtual target is synchronized.

FIG. 15 is a flowchart in accordance with one embodiment for verifying that the members of a mirrored virtual target are synchronized and FIG. 16 is a simplified block diagram including a storage switch 1500 and a command flow to verify that a mirrored virtual target is synchronized. Virtual target 1606 includes physical targets M0 and M1 as members whose synchronization is to be verified. At step 1502, the verification operation begins, for example, in response to a user request received from a management station to verify that the members of virtual target 1606 are synchronized. In one embodiment, CPU 1602 includes a verification service manager (VSM) 1604 to manage the mirrored target verification. VSM 1604 first provisions an IVT including an IVLU(0) 1620 which corresponds to the physical target M0 and IVLU(1) 1622 which corresponds to physical target M1 at step 1504. VSM 1604 designates M0 as the primary member (e.g., in response to a user designation received when beginning the verification). As with an initial mirror synchronization, the IVT can be provisioned at any PPU within storage switch 1600. In the example of FIG. 16, IVT 1608 is provisioned at the PPU associated with source target M0. If the mirrored target includes 3 or more destination targets, a single IVLU including each destination target as a member or multiple IVLUs with one or more destination targets as members can be provisioned. In one embodiment that includes provisioning multiple targets as members of a single IVLU, a verification operation may only return a status that one of the member targets is unsynchronized without identifying a specific target. In such an embodiment, the failed synchronization verification can be corrected by writing the correct data to the single IVLU which will cause the data to be written to each destination target.

After provisioning IVT 1608, VSM 1604 issues a write or verify command, designated as 1 in the command flow of FIG. 16, to the destination target at step 1506. The write or verify command can be routed as previously described with respect to FIG. 14. If target M0 has an available transfer ready signal, a transfer ready signal, designated as 2 in the command flow of FIG. 16, will be returned to VSM 1604 at step 1508. The transfer ready signal may specify a maximum burst or data length that the destination target can receive. After receiving a transfer ready signal from each destination target, VSM 1604 issues a read command, designated as 3 in the command flow of FIG. 16, to the primary target member at step 1510. The read command can specify a burst or data length that is the smallest received from each of the member targets if the read data is to be verified against multiple targets. In response to the read command, target M0 will return one or more data packets to PPU 1612 at step 1512. The read data is received at ingress PPU $1612_1$ and sent to the switch fabric where it routed back to egress PPU $1612_2$. At egress PPU $1612_2$, the read data is converted to verify data at step 1514. For example, the header information for each read data packet can be updated to indicate the data is verify data (e.g., the header information can be changed to a SCSI verify with byte check request) and to indicate the destination identification for the member target(s) being verified. When the read data is received at PPU $1612_2$, the ITCB allocated for the write request is referenced to update the read data header information with values corresponding to the allocated ITCB. In FCP-SCSI, for example, the Read frame header fields, including OX_ID, RX_ID, SEQ_ID, SEQ_CNT, and PARAM are converted to values corresponding to the write or verify command ITCB and data stream. In one embodiment, PPU $1612_2$ converts the read data to verify data at line speed without buffering the data. After converting the read data to verify data, the verify data is routed to PACE 1622 and back to PPU $1612_1$. The verify data packet(s) can be sent to the switch fabric and routed to PPU $1614_1$, associated with destination target M1, at step 1516. The verify data is then provided to the destination target(s) which will compare the verify data with its stored data to determine if the data matches, and thus, that the destination target is synchronized with the source target.

It will be understood by one of ordinary skill in the art that if a transfer ready signal is retuned from a destination target at step 1508 that specifies a data or burst field length that is less than the entire size of an issued verify command, steps 1510-1516 can be repeated until all of the data for the verify command is provided to the destination target(s) for verification. VSM 1604 can issue multiple read commands to the source target in accordance with a burst size specified in a transfer ready signal received from a destination target until a verify command is satisfied. Additionally, multiple verify commands may be issued to the destination targets in order to verify synchronization of an entire VLU. For example, each verify command may be issued for a limited transfer size such as 128K. Accordingly, steps 1506-1516 may be repeated multiple times in order to verify one VLU.

In one embodiment, a linecard CPU can perform an initial mirror synchronization and convert data read from a source target into write data for each destination target. Additionally, a linecard CPU can perform a mirror synchronization verification and convert read data to verify data. A write command is still issued to the destination target member(s) of the mirrored VLU to ensure that each target is available to receive data before a read command is sent to the source target. An internal data route within the switch can be established prior to issuing a read command to the source target to avoid buffering of data within the switch while waiting on a destination target to become available.

Referring to the block diagram (but not the command flow) of FIG. 14, for example, CPU 1410 can begin an initial mirror synchronization or mirror verification by providing a write command to each destination physical target. In one embodiment, each write command is sent directly to the physical target from CPU 1410 without routing through the respective PPUs. In another embodiment, the write commands can be provided to a PPU where an IVT (including one or more IVLUs corresponding to the member(s) of the mirrored VLU) is provisioned as previously described. In such an embodiment, the write commands will be routed from the PPU at which the IVT is provisioned to each destination physical target through its associated PPU. After receiving a transfer ready signal from each physical target, CPU 1410 issues a read command to the source target. As with the write command(s), in one embodiment, the read command is routed through a PPU at which an IVT is provisioned and then through the PPU associated with the source target. In another embodiment, the read command is directly sent to the source target through its associated PACE without passing through a PPU at which an IVT is provisioned. The source target will respond with one or more data packets in accordance with the data transfer length or burst length specified in the transfer ready signal with which it was provided (which length can be the smallest specified by all of the destination member targets). In contrast to the processes described with respect to FIGS. 13, 14, and 15, the read data is not routed to the PPU at which the IVT is provisioned. Rather the read data is routed from the PACE associated with the source target directly to CPU 414. CPU 414 can update the read data packet(s) header information to convert the read data to write data when performing an initial synchronization and read data to verify data when performing a mirror verification. The write or verify data can then be provided to the destination target(s). In one embodiment, the write data is routed directly to the PACE(s) associated with the destination target(s) and then to the destination target(s). In another embodiment, the write or verify data is forwarded to the PPU at which an IVT is provisioned and then to the destination target(s) via the PPU(s) associated with the destination target(s).

Because a write command is issued to each destination target, and the CPU waits for a transfer ready signal from each destination target member before issuing a read command to the source target, data will not be buffered at the CPU while waiting for the destination target(s) to become available to receive the data. However, it should be noted that the read and write data will enter the normal command path to and from CPU 1410 upon leaving the PACE associated with the source target. Accordingly, the data may be buffered at CPU 1410 while the CPU handles other tasks or requests entering the CPU command flow prior to the read data.

Figure 17:
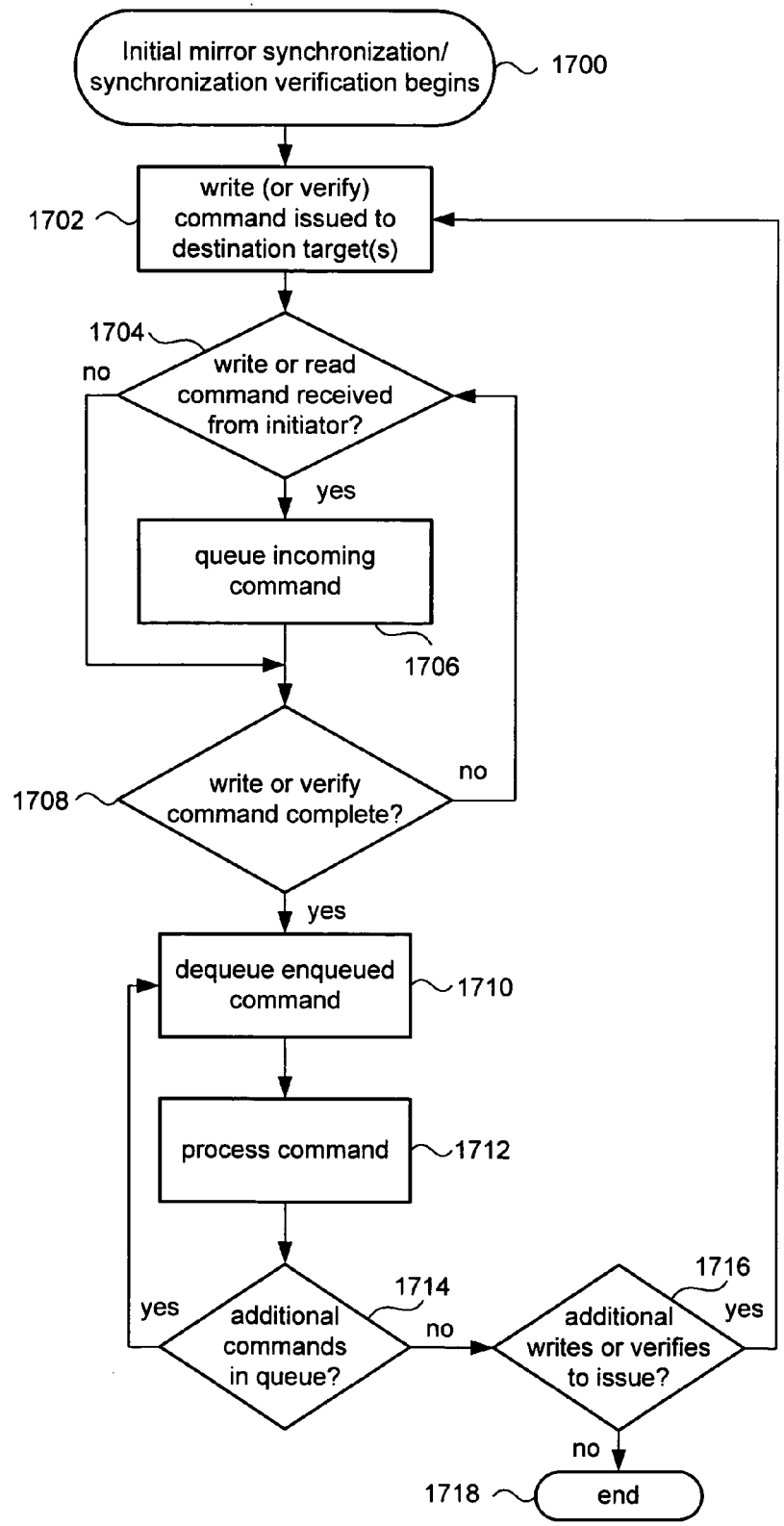
FIG. 17 is a flowchart in accordance with one embodiment for handling incoming commands for a mirrored virtual target while performing an initial mirror synchronization or mirror synchronization verification for the virtual target.

A storage switch in accordance with one embodiment can accept incoming commands from initiating devices during an initial mirror synchronization or mirror synchronization verification of a virtual target. Commands can be received and processed in order to maintain the integrity and synchronicity of the mirrored virtual target during the initialization or verification process. In accordance with one embodiment, a mirrored virtual target can remain "online" during mirror synchronization or verification such that failure responses including busy and task set full status signals are not returned to initiating devices issuing commands to the virtual target. In this manner, initiator pending commands can occur concurrently with an initial mirror synchronization or mirror verification without the initiator experiencing any loss of service. FIG. 17 is a flowchart in accordance with one embodiment for handling incoming commands for a mirrored virtual target or VLU while performing an initial mirror synchronization or mirror synchronization verification for the virtual target.

At step 1700, an initial mirror synchronization or verification of a mirrored VLU begins, such as previously described. At step 1702, a first write or verify command for the synchronization or verification operation is issued to the destination target(s). At step 1704, while the command issued at step 1702 is still pending, it is determined whether a write, read, or other command is received for the virtual target being synchronized or verified. If a command is received, the received command is not immediately routed from the ingress PPU to each of the target members of the VLU. Instead, the incoming command can be routed to the CSM managing the synchronization or VSM managing the verification of the VLU. At step 1706, the incoming command can be queued by the CSM or VSM. In one embodiment, the incoming commands can be queued in a first in/first out buffer (e.g., stored in a local memory such as SRAM 418 of FIG. 3) so they will be dequeued and processed in the order in which they were received. If it is determined at step 1704 that a command has not been received, the process continues directly to step 1708.

At step 1708, a determination is made as to whether the command issued at step 1702 has been processed. If processing of the command is not complete, the flowchart proceeds to step 1704 to determine if an additional command for the mirrored VLU has been received from an initiator.

Once the command issued at step 1702 has been processed, as determined at step 1708, any commands for the mirrored VLU while handling the command issued at step 1702 can be dequeued at step 1710 and processed at step 1712. In one embodiment, the head of the FIFO is accessed and the command at the head dequeued and processed at steps 1710 and 1712. At step 1714, it is determined whether there are additional commands in the queue. If further commands remain, another command can be dequeued at step 1710 and processed at step 1712. After all queued commands have been processed, the process proceeds to step 1716 where it is determined whether additional commands need to be issued and processed to perform the synchronization or verification. If no further commands need to be issued and processed (e.g., all of the source target data has been written to the destination target(s) or all of the source target data has been verified against the destination target(s)), the process is complete at step 1718. If however, additional commands need to be issued and processed to synchronize or verify the mirrored target, operation continues to step 1702 to issue the next command.

By queuing incoming commands received for a mirrored target being synchronized or verified, synchronization or verification can be performed concurrently while receiving commands from initiating devices. This can provide increased performance as the mirrored target can remain online during the processes. Initiating devices will experience no loss of service from the mirrored target. The incoming commands will be processed between commands for the synchronization or verification such that the initiating device "sees" the mirrored target as continuously available.

The foregoing detailed description of the invention has been presented for purposes of illustration and description. It is not intended to be exhaustive or to limit the invention to the precise form disclosed. Many modifications and variations are possible in light of the above teaching. The described embodiments were chosen in order to best explain the principles of the invention and its practical application to thereby enable others skilled in the art to best utilize the invention in various embodiments and with various modifications as are suited to the particular use contemplated. It is intended that the scope of the invention be defined by the claims appended hereto and their equivalents.

What is claimed is:

1. A method performed by a storage switch which routes data between a plurality of initiators and targets in a storage network for managing a mirrored target comprising a source target and at least one destination target, the method comprising:
    determining by the switch an availability of said at least one destination target to receive data by providing one of a write command or a verify command to said at least one destination target;
    providing by the switch a read command to said source target only when said at least one destination target is determined to be available to receive data;
    receiving by the switch read data from said source target in response to said read command;
    converting by the switch said read data to write data or verify data without buffering said read data or said write data or verify data;
    transferring the switch said write data or verify data to said at least one destination target without buffering the write data or verify data; and
    provisioning by the switch a first internal virtual logical unit corresponding to said at least one destination target and a second internal virtual logical unit corresponding to said source target to pre-establish an internal data flow through the switch to facilitate said transferring of data without buffering from said source target to said at least one destination target.

2. The method of claim 1, wherein said step of determining an availability comprises
    determining whether said at least one destination target returns a transfer ready signal in response to said write command or said verify command.

3. The method of claim 1, wherein said at least one destination target comprises first and second destination targets, and wherein:
    said step of provisioning a first internal virtual logical unit comprises provisioning the first internal virtual logical unit corresponding to the first destination target; and
    said method further comprises provisioning a third internal virtual logical unit corresponding to the second destination target.

4. The method of claim 1 wherein:
    said step of provisioning a first internal virtual logical unit comprises provisioning a first member of said first internal virtual logical unit that corresponds to a first destination target and a second member that corresponds to a second destination target.

5. The method of claim 1, wherein said step of determining an availability comprises:
    providing said write or verify command to a processing unit in the switch associated with said first internal virtual logical unit;
    determining by the processing unit a location of said at least one destination target from information provisioned for said first internal virtual logical unit;
    providing said write or verify command to said at least one destination target from said processing unit; and
    determining by the processing unit whether said at least one destination target returns a transfer ready signal.

6. The method of claim 5, wherein:
    said processing unit is a first processing unit; and
    said switch includes a second processing unit, said second processing unit operating as an internal initiator in the switch that provides said first write or verify command to said first processing unit and determines whether said at least one destination target returns a transfer ready signal.

7. The method of claim 6, wherein said step of providing a read command comprises:
    providing a read command from said second processing unit to said second internal virtual logical unit when said at least one destination target returns said transfer ready signal; and
    routing said read command from said first processing unit to said source target using information provisioned for said second internal virtual logical unit.

8. The method of claim 1, wherein said switch has a plurality of processing units, each being associated with one or more targets and each having an ingress portion and an egress portion for data, and wherein said converting said read data comprises:
    receiving said read data at an egress portion of a first processing unit associated with said source target;
    converting said read data to said write data or verify data at said egress portion of said first processing unit; and
    routing said write data or verify data from said egress portion to an ingress portion of said first processing unit; and wherein
    said transferring comprises routing said write data or verify data from said ingress portion to said at least one destination target.

9. The method of claim 8, wherein:
    said read data is one or more read data packets;
    said step of converting said read data to write data or verify data at said egress portion of said first processing unit includes updating header information of said one or more read data packets to indicate that said one or more read data packets are one or more write data or verify data packets.

10. The method of claim 6, wherein said command is a verify command, said method further comprising:
    converting said read data to verify data; and
    transferring said verify data to said at least one destination target;
    and the method further comprises comprising said verify data with data stored at said at least one destination target to verify that said verify data and said stored data are the same.

11. The method of claim 10, wherein converting said read data comprises:
    receiving said read data at an egress portion of said first processing unit;
    converting said read data to said verify data at said egress portion of said first processing unit;
    routing said verify data from said egress portion to an ingress portion of said first processing unit; and
    routing said verify data from said ingress portion to said at least one destination target.

12. The method of claim 11, wherein:
    said read data is one or more read data packets; and
    said step of converting said read data to verify data at said egress portion of said first processing unit includes updating header information of said one or more read data packets to indicate that said one or more read data packets are one or more verify data packets.

13. The method of claim 5, wherein:
    said processing unit is a first processing unit; and said step of providing said write or verify command to said at least one destination target includes providing said write or verify command to a second processing unit in communication with said at least one destination target.

14. The method of claim 1, further comprising:
receiving an initiator provided command for said mirrored target while a synchronization or verification command for said mirrored target is pending;
queuing said initiator provided command;
dequeuing and providing said initiator provided command to said mirrored target when said synchronization or said verification command is complete.

15. The method of claim 14, wherein:
said steps of receiving, queuing, and dequeuing are performed without said initiator experiencing a loss of service of said mirrored target.

16. The method of claim 1 wherein:
said step of converting read data to write data or verify data is performed at line speed.

17. Storage Switch apparatus to manage a mirrored target including at least one destination target and a source target in a storage network that includes a plurality of initiators and targets, comprising:
at least one port in communication with said at least one destination target and said source target;
at least one processing unit in communication with said at least one port, said at least one processing unit determines the availability of said at least one destination target to receive data by providing one of a write command or a verify command to said at least one destination target, and said at least one processing unit further provides a read command to said source target only when said at least one destination target is available to receive data, receives and converts read data from said source target to write data or verify data without buffering said read data or said write data or verify data, and transfers said write data or verify data to said at least one destination target without buffering the write data or verify data; and
a memory in communication with said at least one processing unit, said at least one processing unit provisions in said memory a first internal virtual logical unit corresponding to said at least one destination target and a second internal virtual logical unit corresponding to said source target, said first and second internal virtual logical units establishing an internal data flow through the switch prior to receiving data to facilitate said transfer of the write or verify data without buffering.

18. The apparatus of claim 17, wherein:
said at least one processing unit determines said availability by determining whether said at least one destination target returns a transfer ready signal in response to said write or a verify command.

19. The apparatus of claim 17, wherein:
said first internal virtual logical unit corresponds to a first destination target; and
said memory further includes a third internal virtual logical unit corresponding to a second destination target.

20. The apparatus of claim 17, wherein:
said first internal virtual logical unit includes a first member corresponding to a first destination target and a second member corresponding to a second destination target.

21. The apparatus of claim 17, wherein:
said at least one processing unit includes a first processing unit and a second processing unit, said first processing unit is associated with said first and second internal virtual logical units.

22. The apparatus of claim 21, wherein:
said second processing unit provides said write command or verify command to said first processing unit, said write command or verify command is for said first internal virtual logical unit;
said first processing unit determines a location of said at least one destination target from information provisioned for said first internal virtual logical unit in said memory;
said first processing unit provides said write command or verify command to said at least one destination target after determining said location; and
said second processing unit determines whether said at least one destination target returns said transfer ready signal.

23. The apparatus of claim 22, wherein:
said second processing unit provides said read command to said first processing unit when said at least one destination target returns said transfer ready signal, said read command is for said second internal virtual logical unit; and
said first processing unit routes said read command to said source target using information provisioned for said second internal virtual logical unit.

24. The apparatus of claim 23, wherein said switch comprises a plurality of linecards, each having a plurality of ports in communication with source or destination targets, and wherein said information identifies a linecard and port to which said destination target is coupled.

25. The apparatus of claim 23, wherein:
said write command or verify command is a write command;
said first processing unit receives said read data from said source target after providing said read command, said first processing unit converts said read data to said write data and provides said write data to said at least one destination target.

26. The apparatus of claim 25, wherein:
said first processing unit includes an ingress portion and an egress portion, said first processing unit receives said read data and converts said read data to said write data at said egress portion, said write data is routed from said egress portion to said ingress portion, said write data is routed from said ingress portion to said at least one destination target.

27. The apparatus of claim 26, wherein:
said read data is one or more read data packets; and
said first processing unit converts said read data to said write data by updating header information of said one or more read data packets to indicate that said one or more read data packets are one or more write data packets.

28. The apparatus of claim 23, wherein:
said write command or verify command is a verify command; and
said first processing unit receives read data from said source target after providing said read command, said first processing unit converts said read data to verify data and provides said verify data to said at least one destination target.

29. The apparatus of claim 28, wherein:
said first processing unit includes an ingress portion and an egress portion, said first processing unit receives said read data and converts said read data to said verify data at said egress portion, said verify data is routed from said egress portion to said ingress portion, said verify data is routed from said ingress portion to said at least one destination target.

30. The apparatus of claim 29, wherein:
said read data is one or more read data packets; and
said first processing unit converts said read data to said verify data by updating header information of said one or more read data packets to indicate that said one or more read data packets are one or more verify data packets.

31. The apparatus of claim 22, wherein:
said first processing unit provides said first command to said at least one destination target by providing said first command to a third processing unit in communication with said at least one destination target, said third processing unit routes said first command to said at least one destination target.

32. The apparatus of claim 25, wherein:
said first processing unit is capable of converting said read data to said write data at line speed.

33. The apparatus of claim 28, wherein:
said first processing unit is capable of converting said read data to said verify data at line speed.

34. The apparatus of claim 28, wherein:
said first processing unit is capable of converting said read data to said verify data without buffering said read data or said verify data.

35. The apparatus of claim 21, wherein:
said first processing unit is in communication with said at least one destination target.

36. The apparatus of claim 21, wherein:
said first processing unit is in communication with said source target.

37. The apparatus of claim 21, wherein:
said first processing unit is not a processing unit for a port in communication with said at least one destination target or said source target.

38. The apparatus of claim 17, further comprising:
a memory, said at least one processing unit queues incoming commands for said mirrored target in said memory while said apparatus is processing a synchronization or verification command for said mirrored target, said at least one processing unit dequeues and provides said incoming commands to said mirrored target when said synchronization or verification command is complete.

39. The apparatus of claim 38, wherein:
said incoming commands are received from at least one initiator; and
said at least one processing unit queues said incoming commands without said apparatus providing a failure response to said at least one initiator.

40. The apparatus of claim 39, wherein:
said failure response includes a busy response and a task set full response.

41. The apparatus of claim 39, wherein:
said at least one processing unit queues, dequeues, and provides said incoming commands without said at least one processing unit experiencing a loss of service of said mirrored target.

42. The apparatus of claim 17, wherein:
said mirrored target is a mirrored virtual logical unit.

43. One or more processor readable storage devices having processor readable code embodied thereon, said processor readable code for programming one or more processors in a storage switch to control the operation of the storage switch to perform a method comprising:
determining an availability of at least one destination target to receive data by providing one of a write command or a verify command to said at least one destination target;
providing a read command to a source target only when said at least one destination target is determined to be available to receive data;
receiving read data from said source target in response to said read command;
converting said read data to write data or verify data without buffering said read data or said write data or verify data;
transferring said write data or verify data to said at least one destination target without buffering the write data or verify data; and
provisioning a first internal virtual logical unit corresponding to said at least one destination target and a second internal virtual logical unit corresponding to said source target to pre-establish an internal data flow through the switch to facilitate said transferring of data without buffering from said source target to said at least one destination target.

44. One or more processor readable storage devices according to claim 43, wherein:
said step of converting said read data to write data or verify data is performed at line speed.

45. One or more processor readable storage devices according to claim 43, wherein said at least one destination target comprises first and second destination targets, and wherein said step of provisioning the first internal virtual logical unit comprises provisioning the first internal virtual logical unit corresponding to the first destination target; and the switch further provisions a third internal virtual logical unit corresponding to the second destination target.

* * * * *